(12) United States Patent
Rohafza et al.

(10) Patent No.: US 11,836,246 B2
(45) Date of Patent: Dec. 5, 2023

(54) COMPUTER IMPLEMENTED METHOD

(71) Applicant: Secure Micro LTD, Chepstow Gwent (GB)

(72) Inventors: Ali Rohafza, Chepstow Gwent (GB); Martin Serpell, Chepstow Gwent (GB)

(73) Assignee: Secure Micro LTD, Chepstow Gwent (GB)

( * ) Notice: Subject to any disclaimer, the term of this patent is extended or adjusted under 35 U.S.C. 154(b) by 303 days.

(21) Appl. No.: 17/294,967

(22) PCT Filed: Nov. 14, 2019

(86) PCT No.: PCT/GB2019/053227
§ 371 (c)(1),
(2) Date: May 18, 2021

(87) PCT Pub. No.: WO2020/104772
PCT Pub. Date: May 28, 2020

(65) Prior Publication Data
US 2021/0271752 A1 Sep. 2, 2021

(30) Foreign Application Priority Data
Nov. 19, 2018 (GB) ...................................... 1818791
Nov. 19, 2018 (GB) ...................................... 1818795

(51) Int. Cl.
*G06F 21/54* (2013.01)
*G06F 21/53* (2013.01)
(Continued)

(52) U.S. Cl.
CPC .............. *G06F 21/54* (2013.01); *G06F 21/53* (2013.01); *G06F 21/554* (2013.01); *G06F 21/577* (2013.01)

(58) Field of Classification Search
CPC ........ G06F 21/54; G06F 21/53; G06F 21/554; G06F 21/577
See application file for complete search history.

(56) References Cited

U.S. PATENT DOCUMENTS 3,858,182 A * 12/1974 Delagi .................... G06F 21/54
726/16
5,459,867 A * 10/1995 Adams ................. G06F 9/4843
710/63
(Continued)

FOREIGN PATENT DOCUMENTS

| CN | 1656434 A | * | 8/2005 | ............. G06F 21/14 |
| CN | 1700136 A | * | 11/2005 | ............. G06F 21/53 |

(Continued)

OTHER PUBLICATIONS

InnovationQ Plus—IP.com (Year: 2023).*
(Continued)

*Primary Examiner* — Samson B Lemma
*Assistant Examiner* — Richard W Cruz-Franqui
(74) *Attorney, Agent, or Firm* — DUNLAP CODDING, P.C.

(57) ABSTRACT

A computer-implemented method of making secure computer products is described, including a computer-implemented method of configuring a computer system configured to run an operating system, wherein the method of to enable the computer system to resist the execution of unauthorised software, the method comprising: instantiating an application programming interface to enable an application running on the computer system to access the functionality of the operating system; and applying a transform to the application programming interface to modify the application programming interface.

16 Claims, 25 Drawing Sheets

(51) Int. Cl.
*G06F 21/55* (2013.01)
*G06F 21/57* (2013.01)

(56) References Cited

U.S. PATENT DOCUMENTS

| | | | | |
|---|---|---|---|---|
| 6,230,312 | B1* | 5/2001 | Hunt | G06F 9/465 |
| | | | | 719/331 |
| 6,598,166 | B1* | 7/2003 | Folmsbee | H04L 9/0894 |
| | | | | 713/189 |
| 6,704,802 | B1* | 3/2004 | Finch | G06F 9/54 |
| | | | | 719/315 |
| 7,315,940 | B1* | 1/2008 | Audette | G06F 11/1417 |
| | | | | 713/1 |
| 7,673,181 | B1* | 3/2010 | Lindo | G06F 11/3612 |
| | | | | 714/38.13 |
| 7,861,234 | B1* | 12/2010 | Lobo | G06F 8/52 |
| | | | | 717/136 |
| 7,958,497 | B1* | 6/2011 | Lindo | G06F 11/3632 |
| | | | | 714/799 |
| 8,302,210 | B2* | 10/2012 | Myles | G06F 21/54 |
| | | | | 719/331 |
| 8,510,756 | B1* | 8/2013 | Koryakin | G06F 9/45558 |
| | | | | 718/1 |
| 8,601,584 | B1* | 12/2013 | Lu | G06F 21/54 |
| | | | | 719/313 |
| 8,813,079 | B1* | 8/2014 | Lindo | G06F 9/526 |
| | | | | 718/100 |
| 9,182,990 | B1* | 11/2015 | Tallam | G06F 9/455 |
| 9,904,527 | B1* | 2/2018 | Miller | G06F 8/71 |
| 10,061,933 | B1* | 8/2018 | Myers | G06F 21/604 |
| 10,171,370 | B1* | 1/2019 | Berg | G06F 9/45558 |
| 10,904,291 | B1* | 1/2021 | Naumann | H04L 63/20 |
| 2001/0034712 | A1* | 10/2001 | Colvin | G06F 21/121 |
| | | | | 705/52 |
| 2002/0016918 | A1* | 2/2002 | Tucker | G06F 21/602 |
| | | | | 380/42 |
| 2003/0065663 | A1* | 4/2003 | Chu | G06Q 10/10 |
| 2003/0086571 | A1* | 5/2003 | Audebert | G06Q 20/3829 |
| | | | | 380/277 |
| 2003/0174145 | A1* | 9/2003 | Lyapunov | G09G 5/28 |
| | | | | 345/613 |
| 2004/0158721 | A1* | 8/2004 | Candelore | H04N 21/25808 |
| | | | | 713/182 |
| 2005/0071846 | A1* | 3/2005 | Herschleb | G06F 8/443 |
| | | | | 719/310 |
| 2005/0149726 | A1* | 7/2005 | Joshi | G06F 21/51 |
| | | | | 726/4 |
| 2007/0006314 | A1* | 1/2007 | Costa | G06F 21/577 |
| | | | | 726/25 |
| 2008/0127125 | A1 | 5/2008 | Anckaert et al. | |
| 2009/0133033 | A1* | 5/2009 | Lindo | G06F 11/0778 |
| | | | | 718/108 |
| 2011/0131657 | A1* | 6/2011 | Nojiri | G06F 21/566 |
| | | | | 726/25 |
| 2012/0042145 | A1* | 2/2012 | Sehr | G06F 21/53 |
| | | | | 711/E12.091 |
| 2013/0006722 | A1* | 1/2013 | Ziomkowski | G07B 13/00 |
| | | | | 705/13 |
| 2013/0227556 | A1* | 8/2013 | Tsirkin | G06F 21/53 |
| | | | | 718/1 |
| 2014/0020092 | A1* | 1/2014 | Davidov | G06F 21/54 |
| | | | | 726/22 |
| 2014/0059573 | A1* | 2/2014 | Jawa | G06F 21/602 |
| | | | | 719/331 |
| 2015/0013008 | A1* | 1/2015 | Lukacs | G06F 21/53 |
| | | | | 726/24 |
| 2015/0121035 | A1* | 4/2015 | Steele, Jr. | G06F 12/1018 |
| | | | | 711/216 |
| 2015/0135313 | A1* | 5/2015 | Wesie | G06F 21/51 |
| | | | | 726/22 |
| 2015/0278513 | A1* | 10/2015 | Krasin | G06F 9/5005 |
| | | | | 726/30 |
| 2016/0239334 | A1* | 8/2016 | Yan | G06F 9/45558 |
| 2017/0149807 | A1* | 5/2017 | Schilling | G06F 21/53 |
| 2017/0364452 | A1* | 12/2017 | Okhravi | G06F 11/1048 |
| 2018/0046585 | A1* | 2/2018 | Okhravi | G06F 12/023 |
| 2019/0044971 | A1* | 2/2019 | Sukhomlinov | G06F 9/45558 |
| 2021/0157905 | A1* | 5/2021 | Musseau | G06F 9/442 |
| 2021/0271752 | A1* | 9/2021 | Rohafza | G06F 21/53 |
| 2022/0360594 | A1* | 11/2022 | Cosgrove | H04L 9/0891 |

FOREIGN PATENT DOCUMENTS

| | | | | |
|---|---|---|---|---|
| CN | 101286191 | | 1/2011 | |
| CN | 106209886 A | * | 12/2016 | H04L 63/0428 |
| GB | 2508441 | | 4/2014 | |
| JP | 2008040853 A | * | 2/2008 | |
| JP | 2008076339 A | * | 4/2008 | |
| WO | WO 01/86372 A2 | | 11/2001 | |
| WO | WO2014/111922 A1 | | 7/2014 | |
| WO | WO2016/166744 A1 | | 10/2016 | |

OTHER PUBLICATIONS

Jiang et al., RandSys: Thwarting Code Injection Attacks with System Service Interface Randomization (Year: 2007).*

Gaurav S. KC et al., Countering Code-Injection Attacks With Instruction-Set Randomization (Year: 2003).*

Liang et al., A System Call Randomization Based Method for Countering Code-Injection Attacks (Year: 2009).*

Google Scholar (Year: 2023).*

International Search Report and Written Opinion regarding PCT/GB2019/053227 filed Nov. 14, 2019, dated Feb. 14, 2020.

Xuxian Jiang et al., "RandSys: Thwarting Code Injection Attacks with System Service Interface Randomization", Reliable Distributed Systems, 2007, Srds On, IEEE, Piscataway, NJ, USA, p. 210-217, Oct. 10, 2007.

Hung-Min Sun et al., "A Native APIs Protection Mechanism in the Kernel Mode against Malicious Code", IEEE Transactions on Computers, IEEE, USA, vol. 60, No. 6, Jun. 1, 2011, pp. 813-823.

Gaurav S KC et al., "Countering code-injection attacks with instruction-set randomization", Proceedings of the 10th ACM Conference on Computer and Communications Security; [ACM Conferences on Computer and Communications Security], ACM, Washington D.C., USA, Oct. 27, 2003, pp. 272-280.

UK Intellectual Property Office, Search Report regarding GB1818791.4, dated Apr. 26, 2019.

UK Intellectual Property Office, Search Report regarding GB1818795.5, dated May 1, 2019.

* cited by examiner

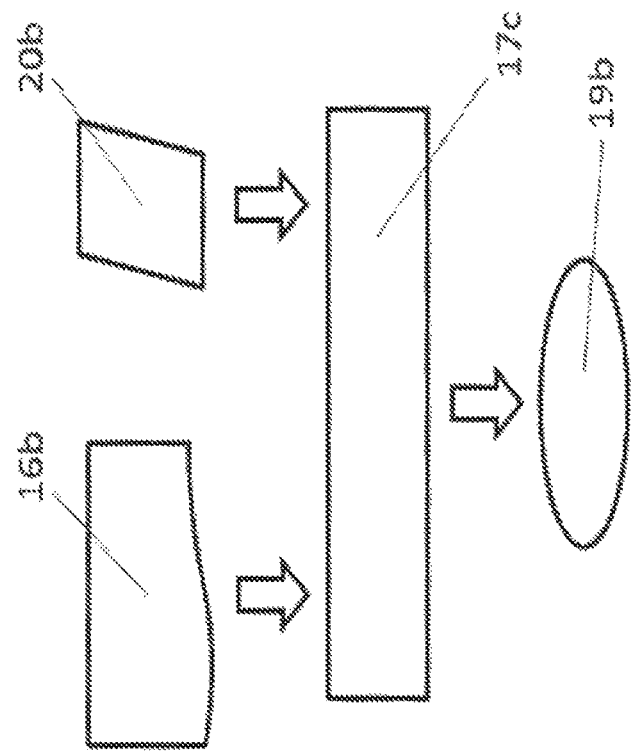
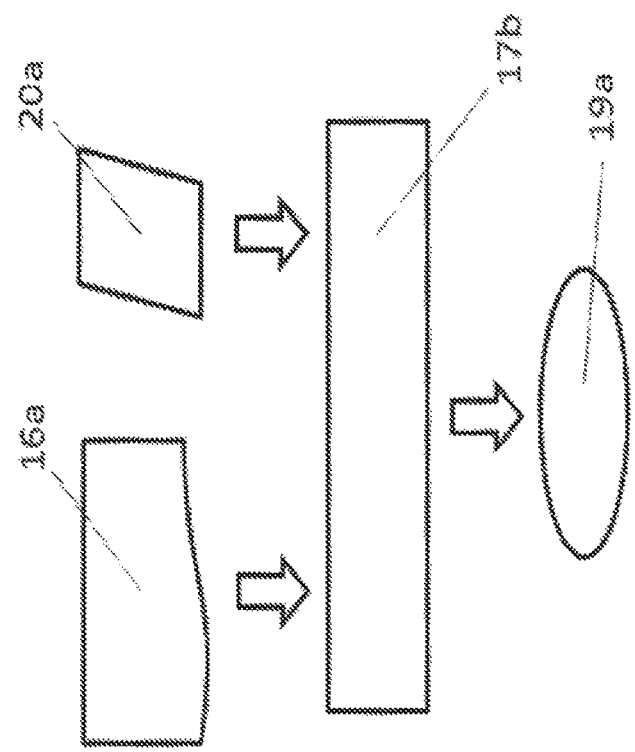
Fig. 7

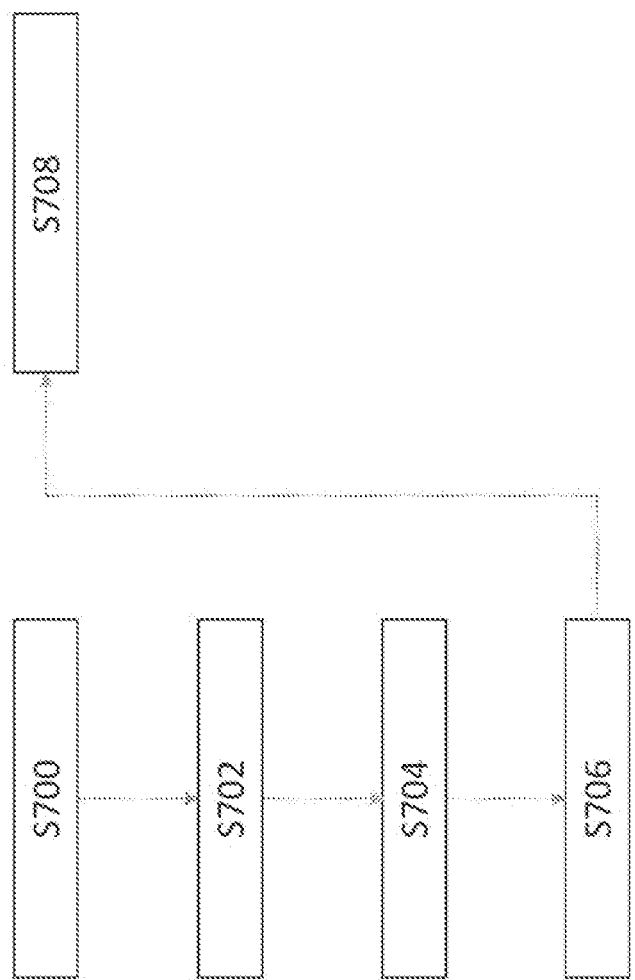

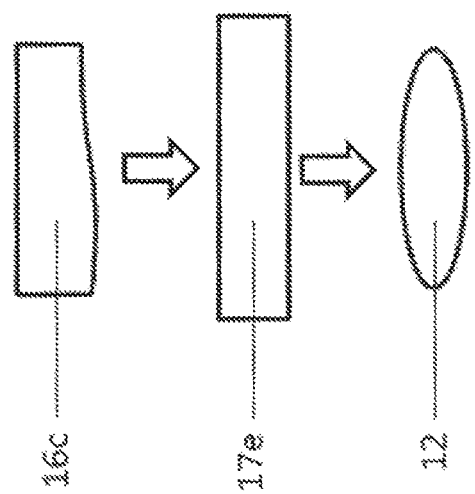

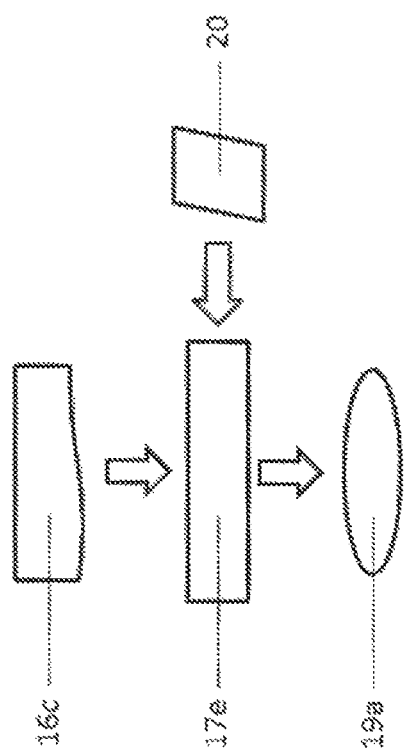

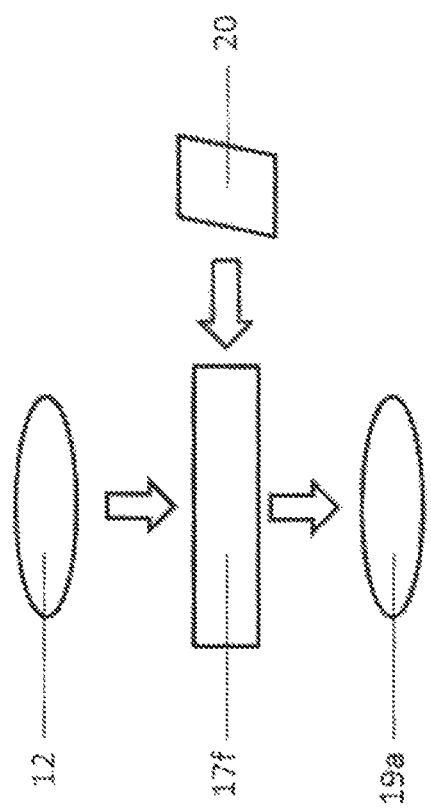

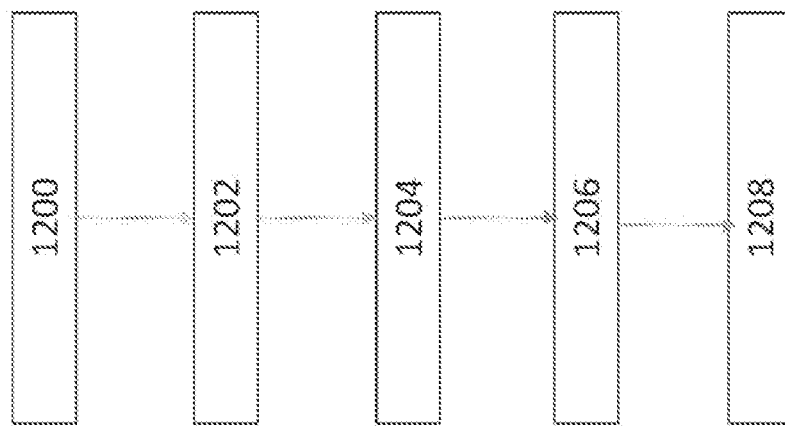

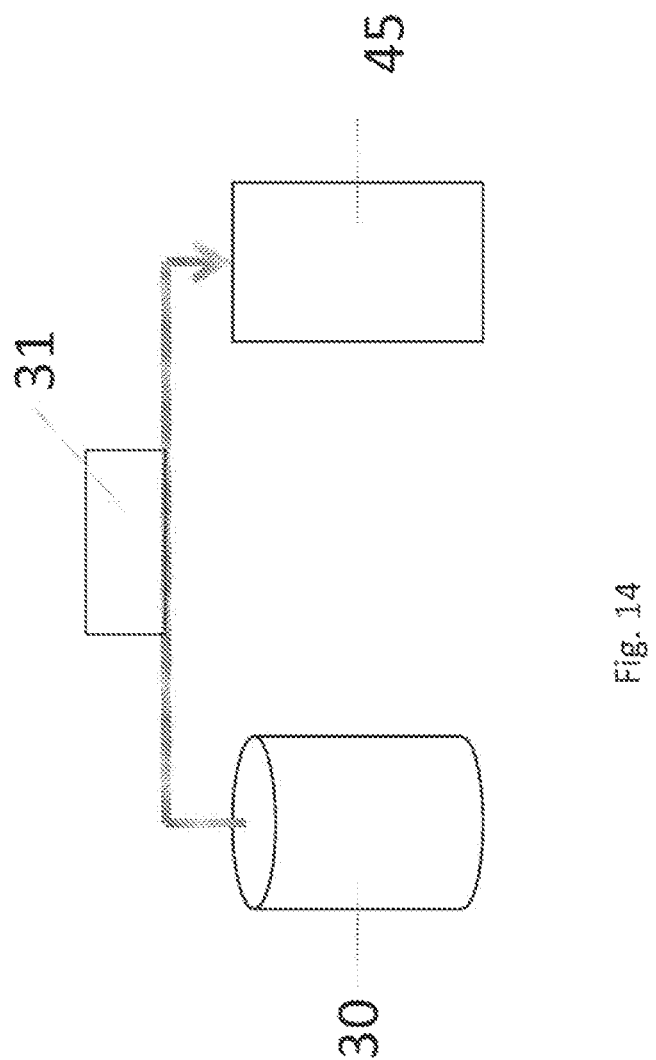

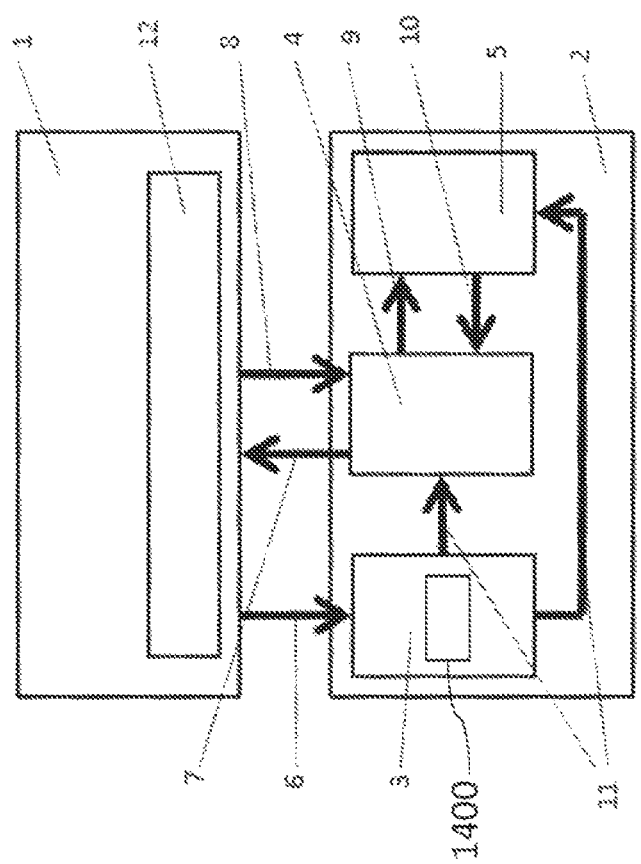

COMPUTER IMPLEMENTED METHOD

CROSS-REFERENCE TO RELATED APPLICATIONS

The present application is a 35 U.S.C. § 371 National Stage patent application of International patent application PCT/GB2019/053227, filed on Nov. 14, 2019, which claims priority to UK patent application GB 1818791.4, filed on Nov. 19, 2018, and to UK patent application GB 1818795.5, filed on Nov. 19, 2018. The entire contents of all of the above-referenced patent applications are hereby expressly incorporated by reference herein.

FIELD

The invention relates to computer implemented methods and, particularly, but not exclusively, computer implemented methods for configuring a computer system.

BACKGROUND

Computer systems are all around us and in use in almost all aspects of modern life. Their ubiquity makes us familiar with their use in our lives and the proliferation of the internet of things, connected and autonomous vehicles and mobile communications technology means that we are increasingly dependent on computer systems working in the way we want them to work when we want them to work.

The configurability of computer systems means they are often vulnerable to being re-programmed by an unauthorised person, persons, organisation or other entities to prevent them carrying out their correct purpose and/or to repurpose its use.

Reprogramming computer systems can influence their functionality which can be advantageous in case they need to be reprogrammed to improve their functionality but it can also be put to nefarious use if they are reprogrammed to behave in a way which could make them dangerous.

Aspects and embodiments are conceived with the foregoing in mind.

SUMMARY

Viewed from a first aspect, there is provided a computer-implemented method of configuring a computer system configured to run an operating system, wherein the method of to enable the computer system to resist the execution of unauthorised software, the method comprising instantiating an application programming interface to enable an application running on the computer system to access the functionality of the operating system; applying a transform to the application programming interface to modify the application programming interface.

The effect of a computer-implemented method in accordance with the first aspect is that the computer system is configured in such a way that only an application which is compiled using a compatible compiler, i.e. compiled with compatible calls to the application programming interface, can be run on that computer system.

Applying a transform to the application programming interface may comprise applying a first transformation process to an indexed table of function calls, wherein the indexed table lists a plurality of function calls each corresponding to an index and the first transformation process re-assigns each index to a different function call.

The first transformation process may comprise the application of at least one operation based on a function call variation key. The at least one operation may comprise the application of a plurality of operations each based on a respective function call variation key.

The at least one operation may be an arithmetic operation. That is to say, any of the arithmetic operations in the plurality of operations may be based on a respective arithmetic operation.

The transform applied may be based on a sequence, re-assignment of calls using a look-up table or another suitable transform.

The function call variation key may be pseudo-randomly or randomly generated.

The transform may assigned to a serial number in a table. This may assist in an update operation to an application to be run on the computer system in that the serial number can be matched to a specific transform which can then be used to retrieve a compiler for that application so that it can be updated effectively to run on the computer system.

The at least one index may be assigned by the first transformation process to an illegal instruction trap, wherein, responsive to an issuing a call for a function corresponding to the illegal instruction trap, the execution of the application is halted.

The at least one index may be selected based on proximity to a vulnerable instruction.

The application programming interface may be instantiated on a virtual machine to be executed on the computer.

The transform may be applied to the parameters received by a function call or the transform may order in which the parameters are received by the respective function. That is to say, if a function corresponding a function call required a particular ordering of the parameters for the function, i.e. a function f receives parameters A,B,C and D in that order, the transform may switch the order around so that, for example, the parameters are received as B,C, A and D. Or, the parameter A which is received as an integer may, following the transform, be received as a large number or a pointer to a location on a stack.

The transform may change the method by which parameters are passed to a function from the application. The passing of parameters to a function may be executed using the stack but the transform may modify this operation by changing it such that the parameter is passed to the function using a block of memory pointed to by an index register.

The transform may change the method by which data is passed by the function to the application. The passing of data by the function to the application may be performed using processor registers but the transform could re-assign this process to mean that it is performed by a different register or it could be reassigned to the stack or a block of memory pointed to by an index register.

Viewed from a second application, there is a computer-implemented method of preventing the execution of an application on a computer system configured in accordance with the first aspect, the method comprising determining the presence of incompatibility between the application and the application programming interface, halting the execution of the application.

Determining the presence of incompatibility between the application and the application programming interface may comprise determining the presence of an illegal instruction in the executable corresponding to the application.

Determining of the presence of an illegal instruction may be performed at run time or by the loader or by the computers system when the program is downloaded.

Viewed from a further aspect there may be provided a computer-implemented method of recovering the functionality of a computer system, the method comprising determining that a version of the computer program is corrupt to indicate a high likelihood of the computer compromising an aspect of the functionality of the computer system, marking the version of the computer program as corrupt, and retrieving a previously stored version of the computer program to recover the aspect of functionality of the computer system, wherein the previously stored version of the computer program is a trusted version of the computer program.

The version of the computer program marked as corrupt may be an update of the previously stored version of the computer program.

The update may be assigned a probationary state by the computer program.

The method may further change of the state of the updated version of the computer program to a trusted version of the computer program responsive to the updated version satisfying at least one trustworthiness criterion.

The at least one trustworthiness criterion may be a plurality of successful runs of the executable corresponding to the update.

The at least one trustworthiness criterion may be a plurality of successful calls to an application programming interface on the computer system.

The indication of a high likelihood of the computer program compromising an aspect of the functionality of the computer system may comprise determining that there is aspect of a computer program executable which is incompatible with the computer system.

The determination of an incompatible aspect of the computer program may occur at download, run-time or during loading by a loader.

Incompatibility may be indicated by the presence of an illegal instruction in an executable corresponding to the version of the computer program.

The presence of the illegal instruction may be determined at download, run-time or during loading by a loader.

Incompatibility between the version of the computer program and the computer system may be indicated by an illegal API call from the previously stored version or update version of the computer program.

A computer system may be configured to implement the method in accordance with any of the aspects described above.

The present invention further proposes another means by which only an authorised person, persons, organisation or other authorised entity should be able to successfully program or reprogram a computer system.

It will be appreciated that any of the aspects which relate to a computer-implemented method may also be a system configured to apply the method. It will also be appreciated that any of the aspects may be implemented using a suitable configured processor.

Viewed from a further aspect, there is provided a computer-implemented method of configuring a computer system comprising a processing module operable to run a computer program executable, the method comprising varying at least one programmable element of the processing module using a first variation applied to the at least one programmable element to modify the processing module.

A computer system may be a system which uses a processing module to determine part of its functionality or response to a situation. Example computer systems include personal and mobile computers, internet-of-things devices, autonomous vehicles, large items of infrastructure, mobile telephones and control systems for controlling a machine or a system.

A programmable element may be any feature of the processing module which can be the subject of an instruction from a computer program executable.

The processing module may be a central processing unit or a virtual machine.

The first variation may be applied to at least one of: the opcodes of the central processing unit, the addressing modes of the central processing unit, the number, function, format or size of registers of the central processing unit, the number of accumulators in the central processing unit, the addresses of system registers in the central processing unit, the format of the system registers in the central processing unit, the addresses of hardware registers in the central processing unit, the format of hardware registers in the central processing unit.

The first variation may be the application of encryption to data stored in main memory by the central processing unit. The first variation may be a change between little endian or big endian representations of data stored on the central processing unit. The first variation may be applied to the ordering of bits stored in memory by the central processing unit. The first variation may be applied to microcode on the central processing unit.

The first variation may disable or enable instructions in the control unit of the central processing unit.

The application of the first variation may comprise the application of at least one arithmetic or logical operation to the programmable element of the central processing unit.

The application of at least one arithmetic or logical operation may be based on a central processing configuration key used as an operand in the respective operation, the at least one arithmetic or logical operation comprises a series of arithmetic or logical operations which may each based on a different operand, i.e. a different central processing configuration key. For example, the arithmetic operation may be to add 1 to each of the opcodes so that only a compiler which generates computer program executables using a code generation step which shifts all of the output instructions by a compatible amount is compatible and only a computer program executable compiled using such an operation may be run on the transformed processing module.

The central processing configuration key may be randomly or pseudo-randomly generated.

The processing module may be a virtual machine.

The programmable element may be a module of a virtual central processing unit which may form part of a virtual machine.

Viewed from a second aspect, there may be provided a computer-implemented method of generating computer program executables which can be executed on a computer system, the method comprising varying a compilation step of a compiler using a second variation to modify the compiler, wherein the second variation is compatible with the first variation, compiling a computer program written in a first programming language into a second programming language using the modified compiler to generate a computer program executable which can be run using the modified processing module generated in accordance with the first aspect.

The first programming language may be a high level language such as C++, FORTRAN or JAVA or it may be assembler.

The second variation may be applied to the code generation step of the compiler.

The second programming language may be machine code or bytecode.

The application of the second variation may comprise at least one arithmetic or logical operation which may use a variation key as an operand, wherein the variation key may be randomly generated or pseudo-randomly generated.

The second variation may be compatible with the first variation if the application of the second variation to the compiler modifies a part of the code generation step corresponding to the at least one programmable element modified by the first variation. That is to say, if, for example, the first variation is a modification to the opcodes of the processing module based on a first variation key, the second variation is compatible if it is a modification to the part of the compiler which generates machine instructions wherein the modification makes an equivalent modification to the machine code instructions generated by the compiler.

Viewed from a further aspect, there is provided a computer-implemented method of updating a computer program corresponding to a computer program executable, the method comprising determining an identifier associated with the computer program executable, using the identifier to determine the variation used when the computer program executable was generated in accordance with the second aspect, applying the variation in the build of an updated version of the computer program executable.

The identifier may be determined responsive to a request from a device configured to run the computer program executable.

Viewed from a fourth aspect, there is provided a computer-implemented method of preventing a computer program from running on a computer system, the method comprising determining the presence of at least one element in a computer program executable indicative of a lack of compatibility with the processing module of the computer system, responsive to the determination of the at least one incompatible element, stopping the running of the computer program.

The presence of at least one element in a computer program executable indicative of a lack of compatibility may be determined during the running of the program. The lack of compatibility may be detected by the malfunctioning of the computer program.

The presence of at least one element may be determined by a loader configured to determine the presence of a machine instruction which does not correspond to a valid opcode on the central processing unit by determining that the corresponding computer program executable has not been compiled with a compiler which has been varied in accordance with a variation compatible with the first variation.

The presence of the at least one element may be determined at run-time where the processing module determines the presence of an illegal instruction, wherein the illegal instruction may be mapped to an interrupt.

The present invention proposes a means by which only an authorised person, persons, organisation or other authorised entity should be able to successfully program or reprogram a given computer, computer controlled or stored program controlled system which comprises a central processing unit configured according to the first aspect. This is achieved by adding variation through a transformation process that is only known to the person, persons, organisation or other entity that is authorised to program or re-program these systems.

An example of the type of variation that may be added is to scramble the values assigned to the opcodes for the CPU using a variation key. If an opcode is represented by an 8-bit number then this provides in excess of $10^{500}$ possible permutations of the opcodes. This modification alone would make the reprogramming of the CPU almost impossible without access to the variation which has been added.

Vulnerability to the unauthorised programming or re-programming of computer, computer controlled and stored program controlled systems is made easy due to large numbers of these systems being identical.

The addition of variation to the central processing units being generated requires a transformation process and may involve the introduction of a variation key where either or both are known only to an authorised person, persons, organisation or other authorised entity. The items now generated all carry out the same function but these items are not identical; different variation keys lead to variation amongst the items produced. For example, the description may describe a computers CPU but now the CPUs being generated are no longer identical, they vary in some way that can only be reliably reproduced if both the modified transformation process is available and the variation key is known. Similarly the compilation of a computer program with a variation key would be used to create executables that themselves have variation. If the variations in the CPU are compatible with the variations in the executable then providing that the transformation processes and/or the variation keys are kept safe no unauthorised person, persons, organisation or other entity can reliably program or re-program the CPU.

An example of the type of variation that might be added, but is not limited to, is to simply scramble the values assigned to the op-codes for the CPU based on the supplied variation keys. If an op-code is represented by an 8-bit number then this provides in excess of $10^{500}$ possible permutations of the op-codes. This alone would make the programming of the CPU virtually impossible without access to the correct transformation processes (tools) and validation keys. Any executable version of a program created without this knowledge would not run correctly and could be easily detected using techniques such as, but not limited to, illegal instruction traps and watchdog timeouts.

Viewed from a further aspect there may be provided a computer-implemented method of recovering the functionality of a computer system, the method comprising determining that a version of the computer program is corrupt to indicate a high likelihood of the computer compromising an aspect of the functionality of the computer system, marking the version of the computer program as corrupt, and retrieving a previously stored version of the computer program to recover the aspect of functionality of the computer system, wherein the previously stored version of the computer program is a trusted version of the computer program.

The version of the computer program marked as corrupt may be an update of the previously stored version of the computer program.

The update may be assigned a probationary state by the computer program.

The method may further change of the state of the updated version of the computer program to a trusted version of the computer program responsive to the updated version satisfying at least one trustworthiness criterion.

The at least one trustworthiness criterion may be a plurality of successful runs of the executable corresponding to the update.

The at least one trustworthiness criterion may be a plurality of successful calls to an application programming interface on the computer system.

The indication of a high likelihood of the computer program compromising an aspect of the functionality of the computer system may comprise determining that there is aspect of a computer program executable which is incompatible with the computer system.

The determination of an incompatible aspect of the computer program may occur at download, run-time or during loading by a loader.

Incompatibility may be indicated by the presence of an illegal instruction in an executable corresponding to the version of the computer program.

The presence of the illegal instruction may be determined at download, run-time or during loading by a loader.

Incompatibility between the version of the computer program and the computer system may be indicated by an illegal API call from the previously stored version or update version of the computer program.

A computer system may be configured to implement the method in accordance with any of the aspects described above.

BRIEF DESCRIPTION OF SEVERAL VIEWS OF THE DRAWINGS

An embodiment in accordance with the above aspects will now be described by way of example only and with reference to the following drawings in which:

FIG. 7 shows the application of variation to the production of a CPU and a Computer Program Executable in accordance with the embodiment;

FIG. 7a illustrates the flow of operations involved with compiling a computer program executable in accordance with the embodiment;

FIG. 9 shows an Assembly language program being assembled into a Computer Program Executable in accordance with the embodiment;

FIG. 10 shows an Assembly Level language program being assembled into a Computer Program Executable with Variation in accordance with the embodiment;

FIG. 11 shows a Computer Program Executable being translated into a Computer Program Executable with Variation in accordance with the embodiment;

FIG. 12 shows the scenario where a device requests an upgrade in accordance with the embodiment;

FIG. 14 illustrates a loader as part of a computer system configured in accordance with the embodiment;

FIG. 14a illustrates a central processing unit configured in accordance with the embodiment;

DETAILED DESCRIPTION

We now describe how prior art systems run computer programs with reference to FIGS. 1 to 5 and a computer program executable 12 which corresponds to a computer program and a central processing unit (CPU) 2.

All computer programs are written in source code of some form. Source code can be written in a wide variety of computer programming languages such as, for example, Visual Basic, C, C++, FORTRAN, Java and multiple others including assembler code and the assembler program which converts assembly code. CPUs on computers cannot determine directly from source code what the computer program is instructing. For this reason, source code is compiled into computer program executables using a compiler which performs the necessary translation between source code and machine code instructions—which the CPU can use to determine the instructions needed to run the computer program.

The computer program executable 12 is the output of a compiler which generates the machine code at the final stage of the compilation process. The generation of machine code is the translation between the parsed and semantically analysed version of the source code of the computer program and the set of machine code instructions which is necessary for the CPU to determine the instructions necessary to run the computer program.

Typically, machine code instructions are described by a machine code identifier, which is often just a number, which corresponds to an operation which is to be performed by the CPU. A computer program executable will simply contain a list of numbers. Each number corresponding to an instruction given to the CPU so that the source code may be run on that CPU.

Figure 1:
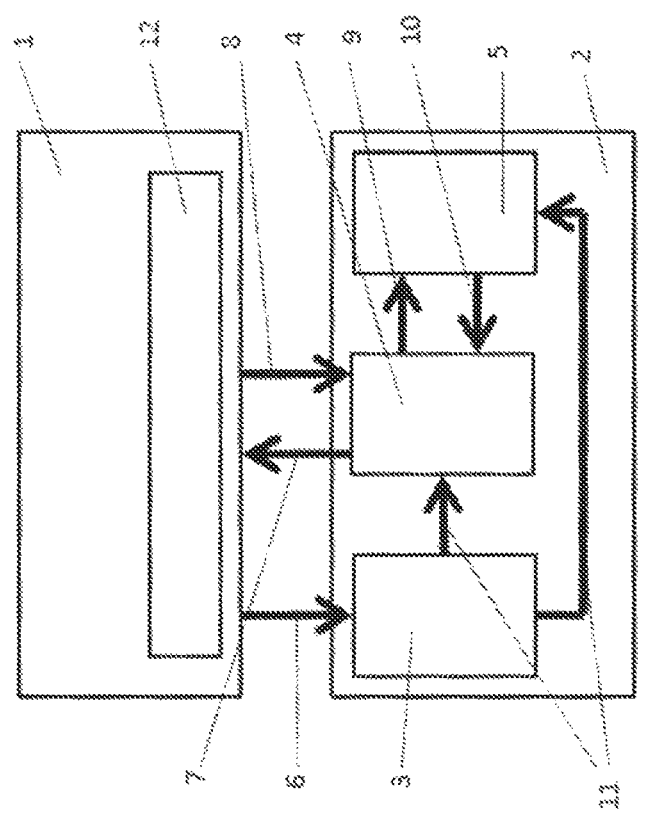
FIG. 1 shows a Central Processing Unit (CPU) and its interaction with Main Memory in accordance with the embodiment.

As illustrated in FIG. 1, machine code instructions in a compiled computer program executable 12 are fetched 6 from main memory 1 to the control unit 3 within the central processing unit (CPU) 2.

The machine code instructions are decoded within the control unit 3 to determine their correspondence with the instructions valid for the CPU and corresponding control signals 11 are then sent to the combinatorial logic 4 and registers 5. In order to determine correspondence between the machine code instructions and the necessary instruction for the CPU 2, the control unit 3 typically uses a lookup table which is indexed by opcodes corresponding to instructions which can be sent to the combinatorial logic and registers 5.

That is to say, the control unit 3 is configured to read the machine code identifiers in the executable and to match up the identifier with a corresponding instruction for the CPU. The instruction is then used to generate a control signal which is sent from the control unit 3 to the combinatorial logic 4 and the registers 5.

The combinatorial logic 4 then carries out the operations associated with the machine code instructions read from main memory 1 in accordance with the control signal sent from the control unit 3. These operations will typically comprise writing to memory 7, reading from memory 8, writing to 9 and reading from 10 registers 5 but may include more complex instructions especially where application-specific CPUs and software are being used. Each of these instructions may correspond to at least one opcode in the control unit 3.

Compilers also provide other forms of functionality. Compilers provide register allocation in that they allocate the variables from the source code to registers in the CPU 2. Optimisation and execution of this process can be carried out using any known means. Compilers also control how operands from the machine code instructions are addressed.

That is to say, the functionality of compilers includes the allocation of the registers of a respective CPU 2 and the addressing modes of the CPU 2.

Figure 2:
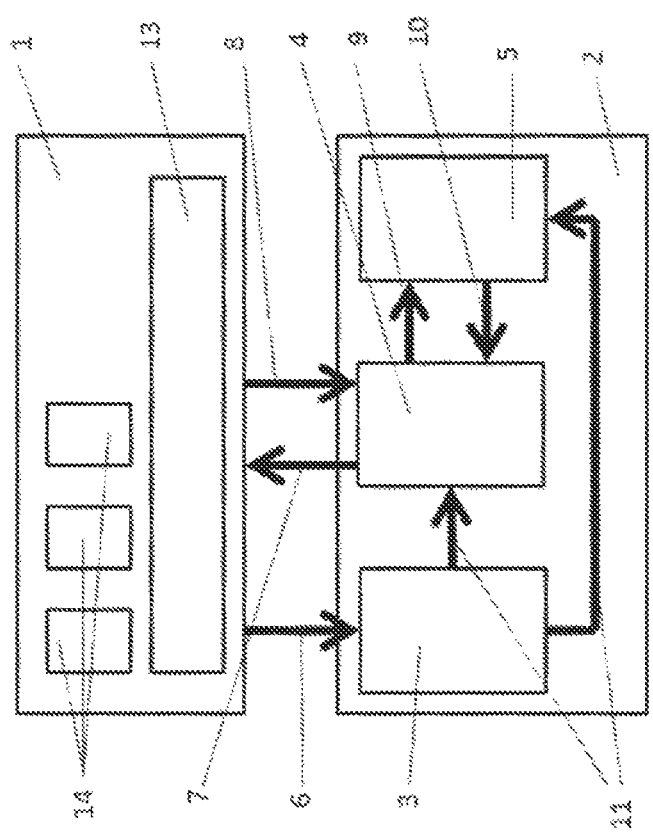
FIG. 2 shows a Central Processing Unit (CPU) and its interaction with Main Memory when an Operating System is installed in Main Memory in accordance with the embodiment.

FIG. 2 shows the scenario where the computer program executable 12 in FIG. 1 consists of a computer operating system executable 13 and a plurality of application program executables 14. That is to say, the computer program executable is not limited to applications for a computer system and it may include the operating system executable 13. Indeed, the computer program executable 12 may only include the operating system executable 13.

The computer operating system executable 13 will typically represent an operating system. Examples of operating systems are Microsoft Windows or Google Android but more application specific operating systems are also available.

Operating systems form an interface between the application program executables 14 and the CPU in that the operating system (executed by execution of the computer operating system executable 13) manages how the resources of the CPU are used for each application. Tasks managed by the operating system include input and output, memory allocation, allocation of processor time, storage and the interaction with peripheral devices such as printers and monitors.

Many modern computers will run a multitude of applications at once and each may correspond to one of the plurality of application program executables 14. Example applications may generally include software which relates to email, internet browsing and text messaging. Other applications may form a connection between the computer and the user's car or house and other applications may enable the user to open doors in their work environment.

Figure 3:
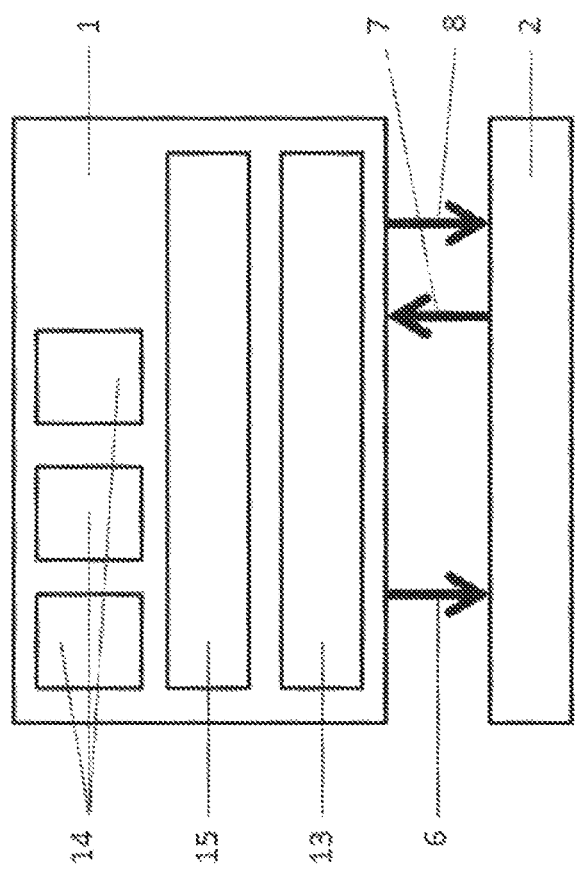
FIG. 3 shows the arrangement when a Virtual Machine has been installed in Main Memory in accordance with the embodiment.

It is also possible for computer programs to be run on a virtual machine as schematically illustrated in FIG. 3. These computer programs may be compiled into code which is suitable for interpretation by a virtual machine. An example form of such code is known as bytecode, FIG. 3 shows the scenario where the computer program executable 12 in FIG. 1 contains a virtual machine 15 and a CPU 2. Here the application program executables 14 are not directly executed by the CPU 2, but by the virtual machine 15. The virtual machine 15 is executed on the CPU 2.

A virtual machine typically includes its own virtual hardware such as a virtual CPU, a virtual network interface and virtual representations of peripheral devices. The virtual machine 15 functions like the operating system described in relation to FIG. 2 in that it manages the virtual resources for the applications that are being run on that virtual machine 15. This means that the applications run on that virtual machine are compiled into bytecode or another suitable form so that the virtual machine 15 can run the applications without direct reliance on instruction from the CPU 2. The effect being that the CPU 2 can directly run applications by executing the machine code instructions found in the computer program executable 12 and can indirectly run applications using the virtual machine 15.

Figure 4:
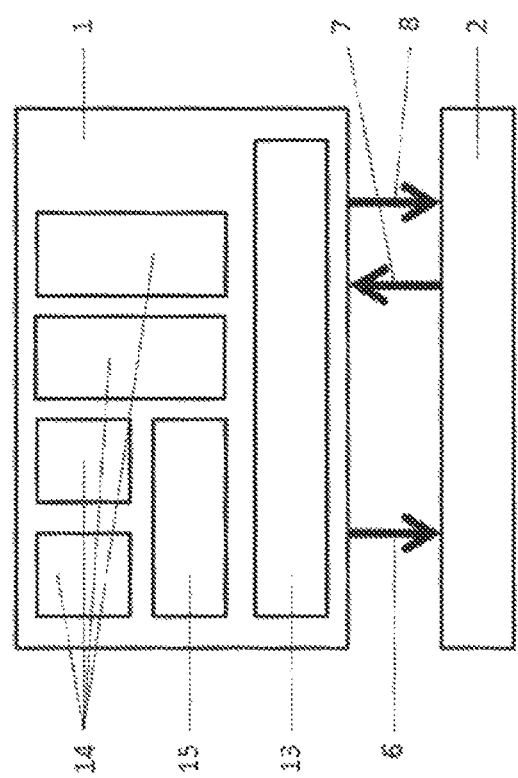
FIG. 4 shows some applications running on the Virtual Machine and some on the hardware CPU in accordance with the embodiment.

FIG. 4 illustrates that application program executables 14 can be created to be executed on a virtual machine 15 or the CPU 2 and that both can execute at the same time ultimately using the same CPU 2. For application programs to be run on both a virtual machine 15 and a CPU 2, there simply needs to be an executable for both so that the program can be run on either. That is to say, there needs to be a first executable which contains machine code instructions that can be executed by the CPU 2 and a second executable which contains bytecode instructions (or the like) which can be executed by the virtual machine 15.

The configuration of computer systems comprising a CPU 2 which is operative to run a computer program executable 12 is typically done in a mass-manufacturing fashion in that many instances of an identically configured CPU 2 are made and many instances of computer program executables 12 are also made. Each instance of the computer program executable 12 can be run on any instance of the CPU 2 because the computer program executable contains instructions which can be executed by the CPU 2.

The architecture, i.e. the instruction set architecture, of the CPU 2 may be published and therefore third parties may also generate computer program executables to be run on those CPUs as a potential third party need only look at the published architecture to access the opcodes that will be accepted and valid in the CPU. This accessibility to the architecture causes a problem in that the CPUs are then open to exploitation which makes any computer system which uses one of the CPUs open to exploitation as it is generally the CPU which carries out instructions provided by an executable.

Figure 5:
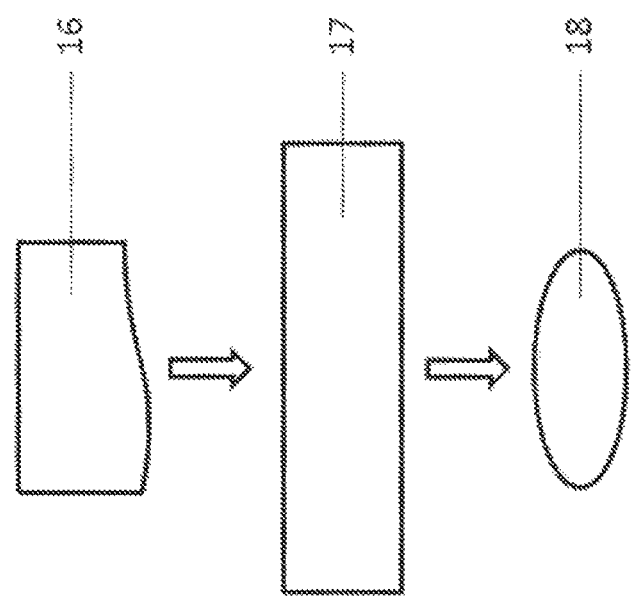
FIG. 5 shows a standard transformation process; in accordance with the embodiment.

FIG. 5 illustrates a transformation process 17 that generates an identical item 18 from a set of instructions 16 every time it is run.

That is to say, the desired set of instructions is passed into a transformation process 17 that provides the item 18 as an output. The item 18 may be a computer program executable or the instruction set architecture for a CPU 2 or an executable which can be used to run a virtual machine 15.

We now turn to a first embodiment of the invention where we describe the configuration of a computer system comprising a CPU 2 which runs a computer program executable 12.

Figure 6:
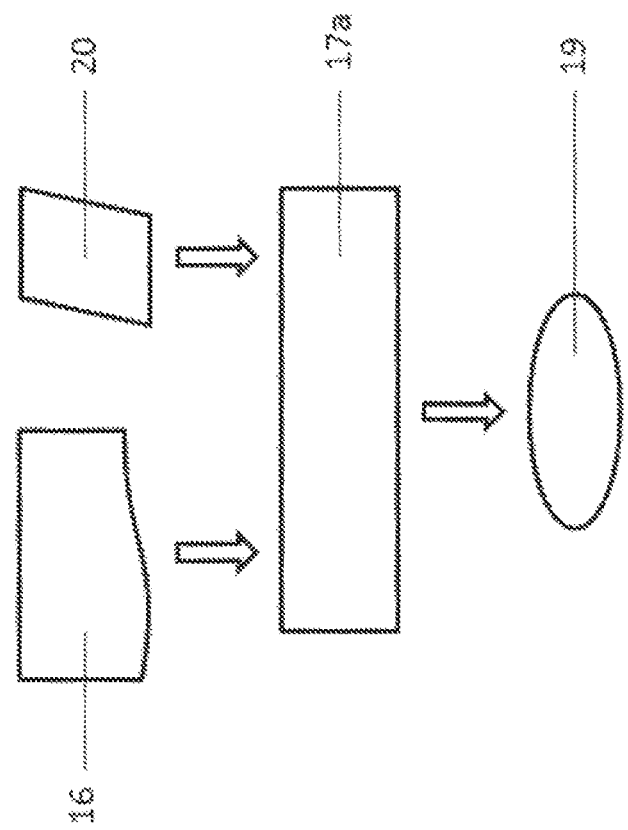
FIG. 6 shows the transformation process with variation added in accordance with the embodiment.

FIG. 6 schematically illustrates a transformation process 17a that creates an item 19 which may vary in some way when the variation key 20 varies, the input instructions 16 remaining the same on each run.

Figure 6A:
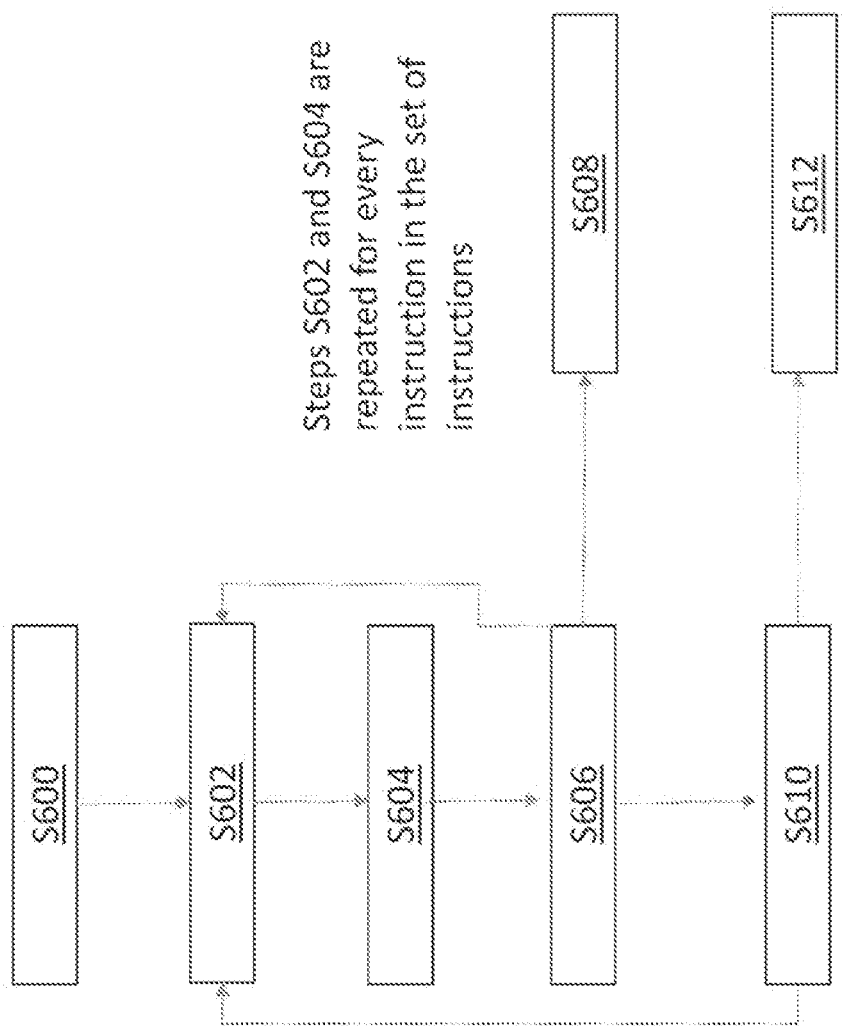
FIG. 6a illustrates the flow of operations involved with configuring a CPU in accordance with the embodiment.

We now illustrate with reference to FIG. 6a how a transformation process may generate an instruction set architecture which can then be used during the configuration of a CPU 2.

FIG. 6a illustrates the example where item 19 is a CPU and the set of instructions 16 is an instruction set architecture which describes the elements of a generic CPU according to a first configuration.

The instruction set architecture describes the configuration of the CPU and all of the programmable elements of the CPU, i.e. the opcodes, the registers, the register allocation, addressing, addressing modes, the accumulators, the representation of data generated and stored by the CPU, the use of encryption and the order in which bits are stored and also describe various other aspects of the functionality of the CPU which a manufacturer of CPUs may wish to configure. Some of these aspects may include data handling and memory operations, arithmetic and logic operations, control flow operations, coprocessor instructions, the transfer of registries from memory, the movement of blocks of memory, the execution of integer and floating point arithmetic, single instruction-multiple data instructions, atomic test-and-set instructions, read-write-modify-write atomic instructions and instructions for arithmetic logic unit operations or any other aspect of CPU functionality.

Instructions for a CPU typically include opcodes and operand specifiers. Operands may specify registers, memory locations, literal data, addressing modes and other aspects of the operation.

The set of instructions 16 is described in a data structure which may be a data file containing a source code description of the instructions written in a hardware description language or a notepad file which sets out the instructions.

The set of instructions 16 is fed into a processor in a step S600. The processor is configured to apply a transformation process 17a to the set of instructions in a step S602.

The transformation process 17a applies an operation to the table of instructions which modifies the opcodes. All of the opcodes are modified in the same way so as to avoid collision.

The modified table of instructions is then written to a file in a step S604.

Any arithmetic or logical operation can be applied to the opcode to perform the modification referred to in respect of step S602 but the same operation is performed on each of the opcodes in the instruction set architecture. The variation key 19 forms the basis of the operation applied to the instruction during the transformation process 17a and acts as a central processing unit configuration key as it characterises the variation in the central processing unit that is introduced by the application of the transformation process to the instructions contained in the control unit 3.

Similar modifications may alternatively or additionally be made to the addressing modes of the CPU 2 or the registers of the CPU 2, particularly the number, function, format and/or size of the registers with the architecture of the CPU 2. That is to say, the variation provided by the central processing unit configuration key may be provided by the application of the transformation process 17a to the addressing modes in the instruction set.

These modifications can be made to a CPU 2 which has already been fabricated as all that is required is access to the control unit 3 or, if necessary, the parts of the CPU which deal with the allocation of registers or the addressing modes.

For example, if the variation key was 1 and the opcode was 00100100 and the operation was to add 1 to each digit, then the opcode would be transformed by adding 1 to each of the binary digits. The opcode 00100100 would then become 11011011, i.e. a different opcode. Alternatively, if the opcodes where described using base 10 numbering, if the variation key was 2 and the opcode was 5 and the operation was to add 2 to each opcode, then the opcode 5 would become opcode 7.

As the step S602 is repeated over the entire instruction set in the control unit 3, all of the opcodes would be modified using the same operation. This would lead to a second instruction set architecture which is distinct from the first instruction set architecture, i.e. the generic instruction set architecture, in that the opcodes in the control unit 3 of the resulting CPU 2 correspond to different operations.

The effect is that the opcodes in the first instruction set are scrambled and only a party who has knowledge of the transformation process 17a would be aware of the specific transformation process that has been applied to generate the second instruction set.

The second instruction set can then be written into local memory by the processor into a step S606. The second instruction set describes a different CPU. This CPU has been varied by the transformation process 17a.

The CPU can then be distributed with the second instruction set in a step S612.

The CPU can then be fabricated in accordance the second instruction set if it had not already been fabricated.

Additionally, variation may be added (pre-fabrication) by varying the number of accumulators in the architecture of the CPU 2 or even by varying the size of the accumulators.

Additionally variation may be provided by varying the addresses of system registers in the architecture of the CPU 2. Additional variation may be provided by varying the format of system registers in the architecture of the CPU 2.

Additional variation may be provided by varying the addresses or formats of hardware registers in the architecture of the CPU 2.

The variation added to the CPU 2 may be a set of instructions added to the control unit 3 which enable the encryption of data which is stored in main memory by the operation of the CPU 2.

Further variation may be added by changing the configuration of the CPU 2 by using big-endian or little-endian representations of the data when it is stored by the CPU 2.

Other variations may be added by altering the sequence in which bits are stored when data is stored in memory. That is to say, bits do not need to be ordered from the least significant bit to the most significant bit, or vice versa, but can be stored in any order. Additionally, further variation may be added by changing the order in which bytes are stored in memory and in instructions. This means that, say, when storing larger data types, the bytes can be stored in the order of high byte to low byte or low byte to high byte—or using some other sequence.

Additional or alternative variations may be provided by varying the stack instructions on the CPU 2 to vary the operation of the stack.

Further variation may be provided by varying the operations available using the CPU 2 in that some instructions which characterise certain operations may be disabled or enabled to prevent some instructions from being carried out or to enable only a specific range of instructions to be carried out.

Additional variation can also be provided by varying the microcode in the CPU 2.

Additionally or alternatively, variation can also be provided by remapping the address space which is controlled by the CPU 2.

Alternatively or additionally, it is possible that a second transformation process may be applied to the new instruction set in step S608 in that the steps S602 to S606 may be repeated iteratively to apply a succession of other transformation processes to the instruction set architecture. The succession of transformation processes may be based on additional central processing configuration keys.

The effect of this is that a CPU becomes highly configurable. For example, the instruction set written into local memory in step S606, i.e. the instruction set which has already been modified, may be distributed to a plurality of second parties.

A first of the plurality of second parties may be a car manufacturer who wants to use a CPU to control an autonomous vehicle. Security is a concern with autonomous vehicles because they are not being controlled by a person, say, but rather by a computer controlled by a CPU. This is not desirable to the car manufacturer as safety is key. Therefore, the car manufacturer may apply at least one of their own transformation processes to the instruction set architecture. Their own transformation processes may be based on an entirely different variation key, i.e. a further central processing configuration key, to the one applied in step S602. The manufacturer of the instruction set architecture provided to the car manufacturer need not know what the variation key is or the transformation process that is being used by the car manufacturer.

A second of the plurality of second parties may be a maker of modems for the domestic environment who is concerned that user privacy will be compromised if the details of the CPU used to control the modem are known. They may make their own CPUs using the instruction set architecture by applying their own succession of transformation processes using their own variation key, i.e. a further central processing configuration key.

In a high security application, the central processing configuration key may be discarded after fabrication of the CPU or even immediately after the transformations have been applied.

The central processing configuration key may well be randomly or pseudo-randomly generated. The operation carried out by the transformation process using the central processing configuration key may well comprise a plurality of arithmetic, comparative and logical operations.

After the second party has applied their own transformation processes in a step S610, a CPU may then be configured (or fabricated) in a step S612 which is configured by the second party for their products and only for their products.

The effect of this is that it is only possible to reprogram the CPU if the applied transformation processes and variations are known.

That is to say, any aspect or characteristic of the CPU 2 can be varied using a variation as part of a transformation process applied to an instruction set architecture which describes that CPU 2.

Instruction set architectures describe the characteristics of a CPU 2 and making a change to an instruction architecture leads to a description of a different CPU 2. To this end, adding variation, whether that is to the opcodes in the control unit 3, to the addressing modes or to other aspects such as whether the CPU 2 is configured to use big endian or little endian representations to represent data or the use of encryption in the storage of data in main memory, generates a different CPU 2.

It will be understood that all of the aspects can be varied prior to fabrication and that some of the aspects can only be varied prior to fabrication of the CPU 2 and that some aspects cannot be varied after fabrication but the range of variation that can be used means that, pre- or post-fabrication of the CPU 2, variation can be added to generate what would be a different CPU 2 with a different architecture.

That is to say, any element of the CPU 2 which can be subject of instruction when a computer program is run on that CPU 2, i.e. any programmable element of the CPU 2, can be varied.

To maintain the security of the CPU 2, the transformation processes and variations applied to the instruction set architecture which is fed into the processor in step S600 must be kept to a minimal number of trusted individuals. Even if a potential hacker knows the instruction set architecture fed into the processor in step S600, they cannot reprogram the CPU 2 unless they know the succession of transformation processes that have taken place between the initial instruction set architecture and the generation of the instruction set architecture which defines the CPU 2.

That is to say, reprogramming of the CPU can be prevented simply by applying a transformation process or a series of transformation processes or some other variation to an aspect of the CPU 2

FIG. 7 shows how the idea of adding variation can be used to ensure that only an authorised person, persons, group or other authorised entity can program or re-program a CPU which has been fabricated in accordance with steps S600 to S612.

That is to say, the principle of applying variation can be used to generate computer program executables that can only be run on a CPU 2 configured in accordance with steps S600 to S612. As the CPU 2 has been configured in accordance with a transformation process or a succession of transformation processes, compatible changes in the compilation of computer programs are then needed to enable those computer programs to run on the CPU 2.

The process of generating a computer program executable and a CPU which have been generated to be compatible will now be described with reference to FIG. 7 and FIG. 7a.

FIG. 7 schematically illustrates a computer program 16a and a variation key 20a being compiled by a software compiler 17b to create an executable computer program 19a with variation 19a. A description of a CPU written in a hardware description language 16b and a variation key 20b are compiled by a hardware compiler 17c to generate a CPU 2 with variation 19b in accordance with steps S600 to S612. The hardware description language includes the register allocation, addressing modes and instruction set for the CPU 2.

FIG. 7a illustrates the steps taken by a processor to generate an executable file which can only be executed successfully on a CPU which has been fabricated in accordance with steps S600 to S612, i.e. using a succession of transformation processes applied to an instruction set architecture.

A request is issued to a processor on a computer to compile the source code corresponding to a computer program 16a in a step S700, using a compiler.

The compiler is configured to execute lexical analysis on the lines of code in the computer program 16*a* in a step S702.

The compiler is then configured to execute syntax analysis on the lines of code in a step S704.

The compiler is then configured to execute code generation on the lines of code in step S706.

In step S706, a transformation process is applied to modify the code generation process as part of the software compiler 17*b*.

The code generation process is the part of the compilation of source code which translates the source code into a form which can be understood by the CPU 2. That is to say, the code generation process translates the source code into machine code, i.e. a series of instructions which are written in terms of opcodes which can be interpreted by the control unit 3 of the CPU 2.

In step S706, an operation is applied based on variation key 19*a* (which we call the executable generation key) to the code generation process which modifies the machine code which is assigned to the lines of source code during the code generation process. In order for the resulting machine code to be correctly interpreted by the CPU 2, i.e. interpreted in a way which is consistent with how the programmer who programmed the computer program intended it to work, when the software corresponding to the machine code is run on the CPU 2, the variation provided by the operation in step S706 must be compatible with the variation used to form the instruction set architecture for the CPU 2.

That is not to say the variation needs to be the same in that the executable generation key needs to be congruent to the central processing configuration key, but rather that the transformation 17*b* merely needs to apply a transformation process which leads to the result that machine code generated during the code generation in step S706 corresponds to the instructions that are valid on the CPU 2 which is fabricated using the modified instruction set architecture, i.e. instructions which correspond to those which can be correctly interpreted by control unit 3 on CPU 2 as the instructions on the CPU 2 correspond to those that were the result of the transformations applied using central processing configuration keys in steps S600 to S612.

That said, the process is simplified if the executable generation key and the central processing configuration key are congruent to one another.

Referring back to our previous example, if the central processing configuration key was 1 and the opcode was 00100100 and the operation was to add 1 to each digit, then the opcode would be transformed by adding 1 to each of the binary digits. The opcode would then become 11011011.

For executable 19*a* to run on a CPU 2 configured in accordance with steps S600 to S612, the transformation process 17*b* needs to apply an operation (or series of operations) which results in all of the machine code which would previously, i.e. before the transformation process 17*b*, have been translated by the code generation process as 00100100, now being translated to 11011011.

Compatibility could be achieved say, by using two operations, a first which adds 2 to the machine code instruction and a second operation which subtracts 1 from the machine code instruction, this would be compatible as the result would be the same.

Similarly, in base 10, if the code generation process would have previously generated machine code as an instruction corresponding to the number 5 and the central processing configuration key used in steps S600 to S612 was 2, then a compatible executable generation key would also be 2 (with the addition operation) and this would transform all of the instructions in the executable by adding 2 to the machine code identifying that instruction.

That is to say, machine code instructions which would have, prior to the application of the transformation process 17*b*, corresponded to the opcode 3 would now correspond to the opcode 5 and instructions which would have previously corresponded to the opcode 17 would now correspond to the opcode 19.

For the executable 19*a* to run on a CPU configured in accordance with steps S600 to S612, the modification to the compiler must ensure that all machine code instructions corresponding to opcode 00100100 were translated to 11011011 so that the CPU 2 can understand that instruction correctly when the executable is run.

If the compatible variation is not applied during the code generation process then the correct machine code will not be generated and the executable will not run correctly on the CPU 2.

The output of step S706 is transformed machine code which can be placed into an executable file 19*a* in a step S708 that can be executed only on a CPU fabricated or configured in accordance with steps S600 to S612 as only a CPU fabricated or configured in accordance with steps S600 to S612 can correctly interpret the executable and correctly execute the instructions in the executable.

The effect of this is that when the control unit 3 in the CPU 2 retrieves the instructions in the modified executable file 19*a*, it can send control signals 11 to the combinatorial logic 4 and registers 5 which enable the computer program to run correctly on the CPU 2.

If the CPU 2 retrieved the executable 16*a*, i.e. the executable corresponding to the computer program prior to the application of the transformation process 17*b*, then the control unit 3 will send incorrect control signals 11 to the combinatorial logic 4 and registers 5 which would prevent the computer program corresponding to the executable 16*a* from running correctly. That is to say, the executable 16*a* may appear to work at first but this would soon be derailed as the instructions would not lead to the desired outcome.

Steps S700 to S708 would also be applied where a succession of transformation operations had been applied to configure the CPU using a succession of different executable generation keys. That is to say, a succession of transformation operations can also be applied to generate the modified executable file 19*a*. Only machine code which had been translated in a compatible way could be used as the basis of an executable file which runs on a CPU configured in accordance with the succession of transformation operations.

Furthermore, if the variation to the instruction set architecture of the CPU 2 has been applied to other aspects of the CPU 2, then the compiler would need to be modified in a compatible way. That is to say, if the variation of the CPU 2 concerns the use of big-endian or little-endian representations of data, say, then the compiler is modified in a compatible way to ensure the modified executable file 19*a* can be correctly executed on the CPU 2 using the big-endian or little-endian representations of data.

Generally speaking, the modified executable file 19*a* will only run on the CPU 2 if it has been varied in a compatible way. That is to say, if the opcodes of the CPU 2 have been varied then the compiler which forms the modified executable file 19*a* will need to match the machine code instructions with the varied opcodes in the control unit 3. That is also to say, if the operations that can be executed on the CPU 2 have been varied in that they have been restricted, the modified executable file 19*a* will only run on the CPU 2 if it uses unrestricted operations. The modification to the compiler must modify the part of the compiler which corresponds to the varied programmable element on the CPU 2.

The variation applied in steps S600 to S612 and S700 to S708 may only be the second layer of variation applied to the respective instruction set architecture and computer program executable.

The instruction set fed into the system in step S600 may contain variation introduced by another variation key prior to the start of steps S600 to S612. The prior variation may be another arithmetic operation using another variation key, i.e. an instruction set architecture generator key, as an operand.

The compiler used in steps S700 to S708 may also contain variation, i.e. an executable compiler key. This needs to be compatible with the prior variation used to vary the generic instruction set architecture prior to the start of steps S600 to S612. The compatibility between the instruction set architecture generation key and the executable compiler key can be achieved using similar principles to the steps described above which maintain compatibility between the transformed CPU 2 and the transformed executable.

The effect would be a compiler generator or "compiler-compiler" which could introduce variation into the compilation process varied to generate different compilers based on a first level of variation.

The use of the prior variation in the instruction set architecture and the variation in the compilers described above increases the utility of the processes described with reference to FIGS. 6*a* and 7*a*.

This means that many layers of variation can be used to configure CPUs and the computer program executables that are run on those CPUs. This means that organisations can confine the programmability of their CPUs to only people or organisations that have the knowledge of the respective transformation processes.

Indeed, any of the variation keys that are used may be randomly generated or pseudo-randomly generated. That is to say, the instruction set architecture generation key, the executable compiler key, the central processing configuration key and the executable generation key may be randomly generated or pseudo-randomly generated. Any of these keys may also be generated using a cryptographic process.

This is not limited to CPUs, but can also be used to prevent unauthorised programming of virtual machines.

As described in relation to FIGS. 3 and 4, some computer program executables need to be run using a virtual machine 15 and not directly by the CPU 2.

A virtual machine comprises a virtual CPU and part of the functionality of the virtual CPU is a virtual control unit which is written in code which configures the virtual CPU to function in much the same way as CPU 2 which has control unit 3. That is to say, part of the virtual CPU is code which converts bytecode instructions into operations on the virtual machine using corresponding opcodes that are written into the virtual control unit. Those bytecode instructions are generated by a compiler which is configured for compiling source code into bytecode instructions rather than machine code instructions. Variation can be added to compilers which compile source code into bytecode instructions and compatible variation can be added to virtual CPUs in much the same way as is described above in relation to steps S600 to S612 and S700 to S708.

That is to say, the principles which are applied to generate CPUs which can only be programmed if a transformation process is known can also be applied to applications which run on virtual machines. Therefore, it is possible to use the principles described in relation to steps S600 to S612 and S700 to S708 to configure virtual machines which can only run software which has been compiled using a compatible transformation.

Computer programs that are written in a high level language are not always compiled into machine code, or virtual machine code, in one step. Instead they might be compiled into an assembly language (also known as assembler) for the CPU or virtual machine that they will be executed on. Assembly language is a mnemonic way of representing the binary machine code used by CPUs, or virtual machines, which is easier for humans to read and write.

Figure 8:
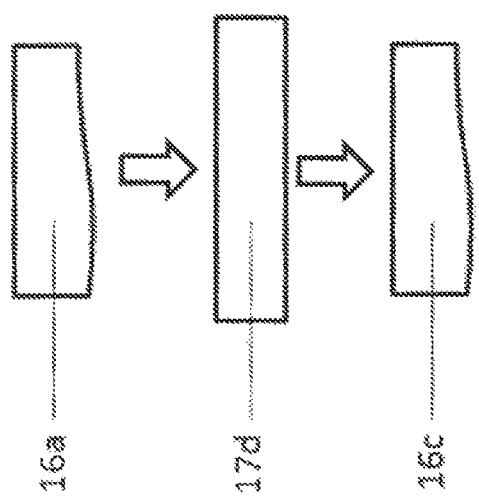
FIG. 8 shows a High Level language program being compiled into Assembly Language in accordance with the embodiment.

FIG. 8 shows how a software compiler 17*d* can be used to compile a computer program written in a high level language 16*a* into a computer program written in assembler 16*c*.

The variation in the compiled computer program may be added at the code generation step which converts assembly language into machine code similar to the principles described in relation to steps S700 to S708 using a variation key (which may be described as an assembler variation key).

The assembly language form of the program is converted into a computer program executable 12 by an assembler 17*e*. FIG. 9 illustrates schematically an assembler 17*e* being used to assemble a computer program written in assembler 16*c* into a computer program executable 12 which contains instructions for the computer program executable 12 in machine code.

For the machine code to be executed successfully on a CPU 2, the variation added by the assembler variation key must be compatible with the variation, i.e. the central processing configuration key used to configure the CPU 2 on which the machine code is going to be run, i.e. the process of configuration which is described in relation to steps S600 to S612.

That is to say, the variation added to the code generation process which forms the computer program executable 12 by the assembler variation key must modify the machine code instructions in a way which means that changes are made to the machine code instructions so that they can be correctly interpreted by the control unit 3 of the CPU 2 (which have been transformed by the central processing configuration key).

FIG. 10 schematically illustrates how variation can be added to an assembler to cater for the situation when all or part of the computer program is written in, or compiled to, or generated in assembly language and needs to be converted to a computer program executable 12. An assembler 17*e* inputs a computer program written in assembler 16*c* and an associated variation key 20 and outputs an executable computer program executable 12 which includes the variation provided by the assembly variation key.

The compatibility between the transformation applied by assembler 17*e* and the variation applied during the configuration of the CPU 2 using the central processing configuration key (2) means the computer program executable 12 can be run on the CPU 2.

FIG. 11 shows how a computer program executable 12 can be converted by an executable translator 17*f*, which reads in the computer program executable 12 and a variation key 20, to output an executable computer program with variation 19*a*. In this way the existing software development tool chain does not require any modification. This also allows for the development and testing of software on a standard CPU or Microcontroller before variation is added prior to deployment.

Figure 11A:
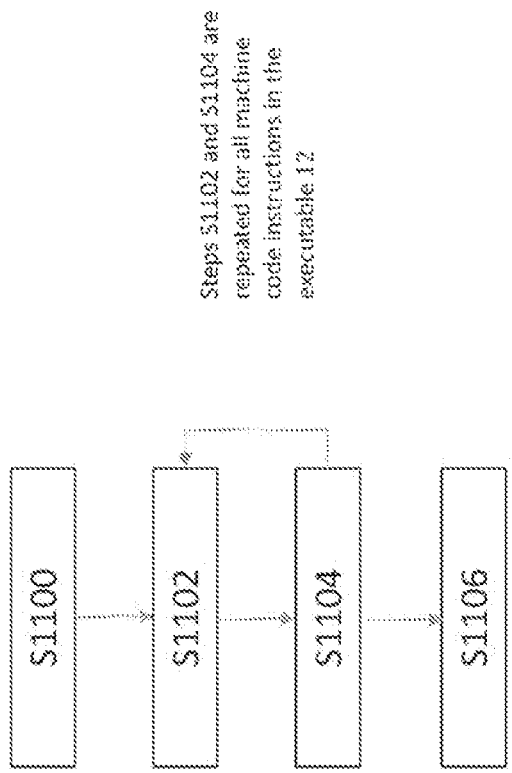
FIG. 11a shows the flow of operations involved with updating a computer program executable in accordance with the embodiment.

We now describe with reference to FIG. 11a how the computer program executable 12 can be varied to run on a CPU 2 which has been varied in accordance with steps S600 to S612.

A computer program executable is, as described above, a file which contains instructions to the CPU 2 which enable the CPU 2 to run the computer program which corresponds to the executable.

As also set out above, for a computer program executable to run on a CPU which has been varied in accordance with steps S600 to S612, the machine code needs to contain compatible instructions, i.e. instructions which have been modified in a compatible way.

A computer program executable 12 is input into a transformation process 17f in step S1100. The computer program executable 12 contains machine code which would enable a CPU configured according to the generic instruction set architecture referred to in step S600 to run the corresponding computer program.

In step S1102, the transformation process 17f is configured to read each instruction and apply a compatible modification to each of the instructions in the computer program executable 12.

That is to say, all instructions in the executable 12 which correspond to say, opcode 00100100 would, following the transformation process applied in step S1102, correspond to opcode 11011011 to enable the modified instructions to be compatible with the CPU 2 configured in accordance with steps S600 to S612. Similarly, if a succession of transformation processes had been performed to fabricate a CPU 2, then a compatible succession of transformation processes would need to be performed on the executable 12 to enable the executable to be run on that CPU.

The modified instructions are then written to a new executable file 19a in a step S1104 and the process is repeated for all instructions in the executable to 12 to form a modified executable file 19a which has variation which enables it to be run on a CPU 2 which has been configured in accordance with steps S600 to S612.

The modified executable is then output in a step S1106.

The effect of this is that when the control unit 3 in the CPU 2 retrieves the instructions in the modified executable file 19a, it can send control signals 11 to the combinatorial logic 4 and registers 5 which enable the computer program to run correctly on the CPU 2. If the CPU 2 retrieved the executable 12, i.e. the executable corresponding to the computer program prior to the application of the transformation process 17f, then the control unit 3 will send incorrect control signals 11 to the combinatorial logic 4 and registers 5 which would prevent the computer program corresponding to the executable 12 from running correctly.

We now illustrate with reference to FIG. 12 a process by which a device configured in accordance with steps S600 to S612 requires an upgrade to its software.

A host server determines that a software upgrade is required on a device comprising a CPU 2 configured in accordance with steps S600 to S612. This is in a step S1200. This determination may be based on an upgrade schedule held at the host server or it may be responsive to a request from the device.

In a step S1202, the company determines a serial number associated with the device. This may be either by issuing a request to the device or by retrieving a serial number from a lookup table.

The serial number corresponds to a particular transformation process 17c which was applied to the CPU 2 when it was configured in steps S600 to S612. That is to say, the serial number can be used to identify the various keys used and the operations based on those keys, when the CPU 2 was generated.

The company then retrieves the upgraded software for the device and compiles the software into an executable file for that device using the appropriate compatible variation key in a step S1204.

The executable file is then transmitted to the device in a step S1206 where it can be installed on the device and run in a step S1208.

The effect of this is that the computer programs which run on the device can be updated accordingly and the computer program executables which are generated can be run on the device comprising CPU 2.

The additional effect of the process set described in relation to FIG. 12 is that the CPU 2 is protected against computer program executables which correspond to illegal computer software.

That is to say, if the device receives a computer program executable which has not been configured using the correct transformation process, i.e. an incompatible computer program executable, then the illegal computer software can be detected before it becomes troublesome.

A computer program executable which does not have compatibility with the CPU 2 running the device will be incompatible because the instructions in the computer program executable will not correspond to the correct opcodes for the correct running of the CPU 2. The lack of compatibility will cause a malfunction in the computer program. Similarly, the CPU 2 may additionally malfunction due to incorrect or invalid addressing used in the computer program executable.

Typically, devices will have features that will detect when a computer program is malfunctioning. These features may include watchdog timers, illegal instruction traps and out of range read/write detection. If the CPU 2 initializes any of these features due to the lack of compatibility between the executable and the CPU 2, then the CPU 2 will have determined that the computer program executable is indicative of software which should not be run on the machine. That is to say, the computer can then prevent the computer program executable from running on a computer system comprising the CPU 2 and this prevents a computer program corresponding to the computer program executable from running on the computer.

The hard drive of the computer system may also be configured to perform a scan on the computer program executable to determine whether the executable is compatible with the CPU 2. The hard drive may be configured to scan the executable for instructions in the machine code in the computer program executable which correspond to illegal instruction traps in CPU 2. The hard drive is the configured to stop that executable from being loaded and run using the CPU 2.

A similar process can be used when the device runs the software through a virtual machine 15.

Figure 13:
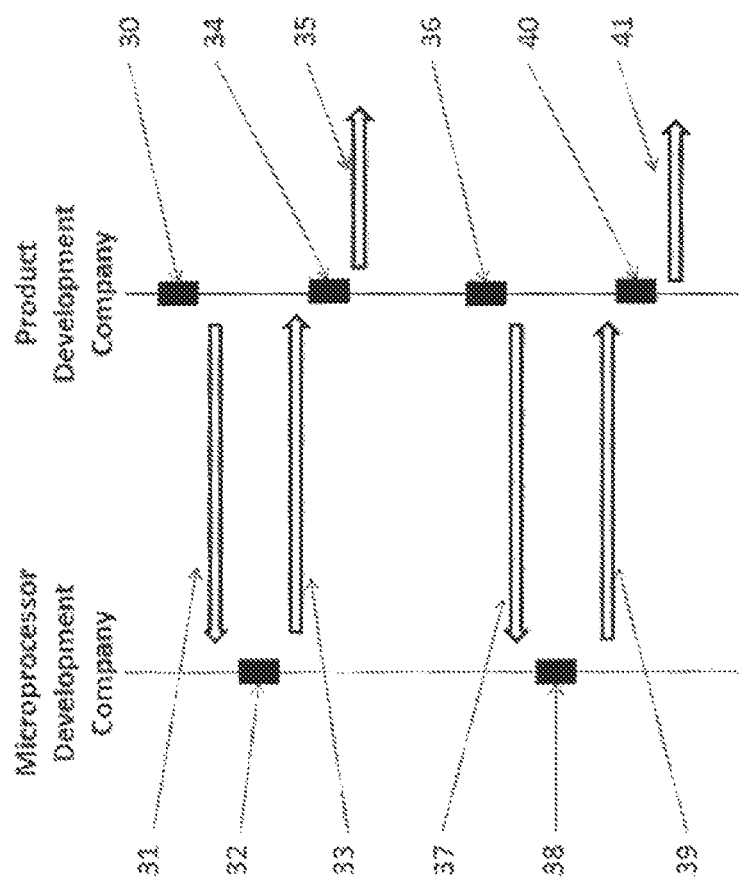
FIG. 13 shows a scenario where a product development company creates a secure version of an existing product in accordance with the embodiment.

The scenario in FIG. 13 shows a product development company creating a secure version of an existing product. The product development company chooses a microprocessor core to use in their new product and places an order for them 31. The chosen microprocessor development company packages the core and associated development system 32. The core and associated development system is shipped to the product development company 33. The product development company develops their new product 34. The product development company sells their new product 35.

Sometime later the product development company realizes that there is a market for a secure version of their new product 36. The product development company requests a secure version of the microprocessor core and development system from the microprocessor development company 37.

The microprocessor development company create a unique tool, using a variation key, for creating cores with variation and the associated development system 38. They place a serial number (or other identification) into the new tool and keep a record of this with the variation key that was used. This allows them to update the tool if required in the future.

The microprocessor development company ship the unique tool to the product development company 39. The product development company now rebuild their existing product, using variation keys, with the new tools to create a product which is secure as it includes variation 40. The product development company sells their secure version of their product 41.

Each product that is sold may contain a serial number (or other means of identification). This along with the variation key used to create it may be recorded by the product development company so that the product can be update if required in the future. Providing the mapping of serial numbers (or other means of identification) to variation keys is kept safe only the product development company can re-program the product.

The embodiments described in relation to FIGS. 6 and 7 modify the computer program executable 12, the control unit 3, registers 5 and other parts of the CPU 2 in ways that create multiple variants of them that carry out the exact same functionality as before modification but only do so if all are modified in a compatible way. Protection of the modification process ensures that the variants of the CPU 2 can only be programmed or re-programmed by an authorised person, persons, organisation or other authorised entity.

We now describe, with reference to FIG. 14, how the use of variation in the configuration of CPUs can be used to prevent illegal computer programs from loading onto a computer system comprising a CPU 2 configured in accordance with steps S600 to S612.

A loader is a part of the operating system of a computer that is responsible for retrieving a computer program executable file from storage and transforming it into a form in which it can be run by the CPU. The loader places the transformed form of the computer program executable file into the memory of the computer which means that the operating system can access the executable and provide it to the CPU at the next opportunity.

The CPU 2 is configured using variation in accordance with steps S600 to S612 and will only be able to correctly interpret executable files which are compiled using a compatible compiler. This means that the executable files will contain machine code instructions which correspond to opcodes which are valid for the CPU 2.

By adding a compatible variation to the loader 31, i.e. making a modification to the opcodes and the addressing that can be validly used on the loader, then this configures the loader (as part of the computer system) to determine the presence of invalid opcodes or addressing when it performs the step of determining the instructions contained in the executable file retrieved from secondary storage 30 (which could be a hard disk or any other suitable storage medium) as when the loading process begins it starts with validating the contents of the executable file.

That is to say, if an executable file has not been compiled using a compatible compiler, i.e. it is a rogue executable file corresponding to a rogue computer program, it will contain machine instructions which will be invalid and this will be detected by the loader 31 during the initial validation step. Upon determination of the presence of an invalid machine instruction, the loader 31 is then configured to abort the loading process and prevent the operating system from accessing the rogue executable. This will prevent the rogue executable from being loaded into main memory 45 and protect the computer system from executing the rogue computer program.

It is also possible to determine the presence of rogue computer programs at run-time. The CPU 2, i.e. configured in accordance with steps S600 to S612, will maintain a look-up table with valid instructions which is used by the control unit 3 to generate control signals to be transmitted to the combinatorial logic 4 and the registers 5.

However, it is unlikely that all opcodes for a particular CPU will correspond to a valid instruction and for that reason it is unlikely that, even if the opcodes have been transformed using a central processing configuration key as described in relation to FIG. 6, all of the possible opcodes will correspond to an instruction. In one example, a CPU 2 with 8 bit addressing may only utilise 200 out of 256 possible opcodes but for valid instructions. A computer program which has been compiled to be compatible with the CPU 2, i.e. compiled in accordance with steps S700 to S708, will only utilise the 200 valid opcodes and no others. That is to say, 56 opcodes will be usable in a computer program executable but will not correspond to valid instructions.

A plurality of the invalid opcodes may be mapped to an interrupt module 1400 in the control unit 3 which generates an interrupt during the running of a computer program executable which has one of the unused opcodes. That is to say, a CPU 2 which is configured in accordance with steps S600 to S612 may be configured to determine a lack of compatibility with the software it is running by determining the presence of an opcode which does not correspond to a valid instruction. The interrupt module 1400 is configured to generate an interrupt which stops the running of the respective program when the CPU 2 determines the presence of an opcode which does not correspond to a valid instruction. Such a CPU 2 is illustrated in FIG. 14*a*.

If particular vulnerability is suspected in a computer program or a device running that computer program, then specific opcodes that are invalid but which are numerically close to opcodes which are valid may be targeted to ensure that those specific vulnerabilities are mitigated. This may occur where a valid opcode relates, for example, to access to memory and/or peripheral devices where the authorised user suspects unauthorised users will target those opcodes. Opcodes close to those opcodes but which are in fact, invalid opcodes, may be specifically mapped to an interrupt by the control unit 3.

Equally, virtual loaders as part of virtual machines may also be configured to execute an interrupt module which generates interrupts on the detection of an invalid opcode in an executable being run the virtual CPU 2.

We have described, thus far, several embodiments which relate to the CPU 2 and the variation that can be utilised in the CPU 2 and the loader 31 and respective compilers to prevent computer programs from being run on incompatible CPUs.

We can also introduce similar variation into an application programming interface (API) to provide further protection against access to a computer system from unauthorised users.

Many computer systems utilise an API. An API is an interface between the applications which are to be run on a computer system and the operating system which is managing the computer system.

An API may manage aspects of process control including the loading of computer programs, the execution of computer programs (which becomes a process), the creation of the process, the termination of the process, the deletion of the process and the retrieval and setting of process attributes. An API may also manage aspects of file management including the creation and deletion of directories and files, the opening and closing of files, reading from and writing to files and retrieval and setting of file attributes. An API may also manage aspects of device management such as the allocation and deallocation of devices, reading from and writing to devices and the retrieval and setting of device attributes. An API may also manage aspects of semaphore creation, waiting, signalling and the creation of inter process messaging in addition to the sending and receiving of those messages. Many other aspects of system functionality may also be managed by an API.

Each aspect of system functionality is implemented by a routine which will be loaded by the loader 31 into the CPU 2 as part of the computer operating system executable 13 or as any one or more of a plurality of application program executables 14.

In every build of the operating system the routines within the operating system that provide these functions would be located in a different location and hence a standardised backwards compatible means of accessing them must be provided. One of the ways of accessing these functions is by storing the addresses of the routines in a lookup table which indexes the functions which are implemented using the operating system.

Any programme which needs to access any one or more of these functions only needs to know the correct index in the table corresponding to the required function.

Control is passed to the operating system using a system call from the respective program. This call can be implemented using a software interrupt instruction or any type of system call. The index into the table is passed in this call. It can be passed as part of the system call instruction, via a register, the stack or by some other means.

Each value of the index allows access by the respective computer program to the associated operating system or hardware function. This is one way a rogue computer programme could gain access to the operating system and hardware.

This vulnerability can be reduced by reassigning the index values to different operating system or hardware functions or to no function at all. This is achieved using a variation imposed onto the index values using a function call variation key.

If this reassignment is only known to an authorised person, persons, organisation or other authorised entity then only that authorised person, persons, organisation or other authorised entity can write applications (computer programmes) that can successfully use the application programming interface. This variation to the ordering in the table of the addresses of the routines that provide the operating system or hardware functionality provides protection from attack from an unauthorised person, persons, organisation or other entity.

Figure 15:
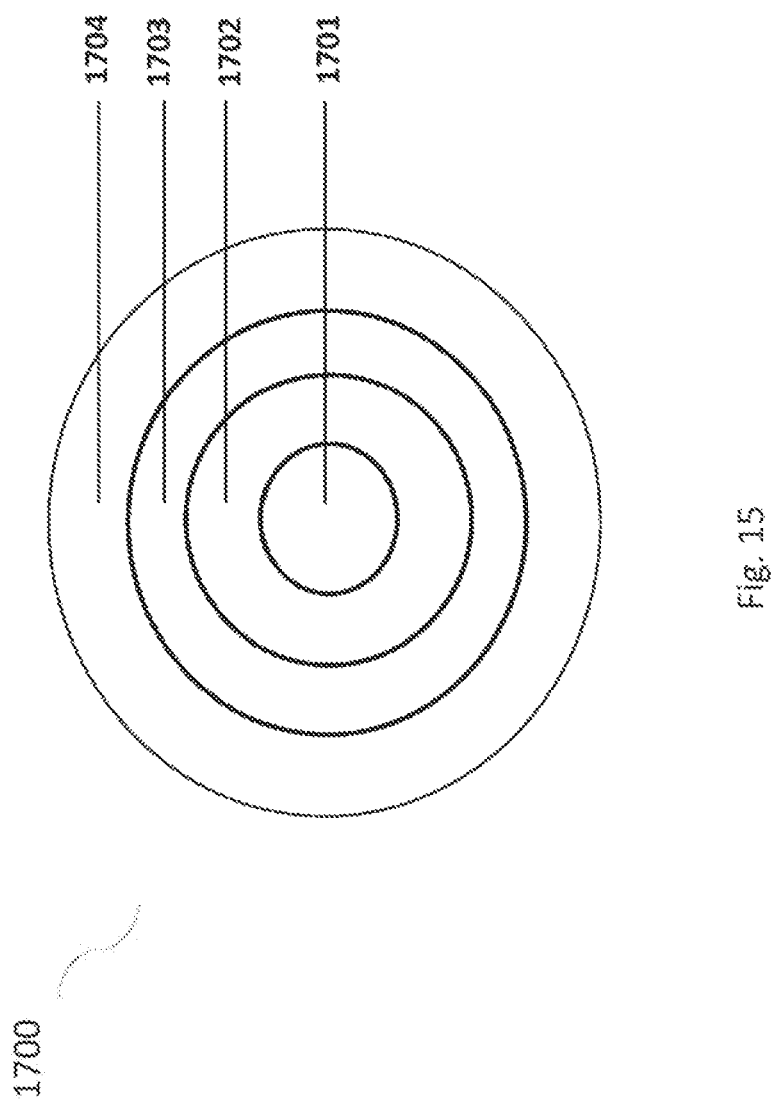
FIG. 15 illustrates a concentric layer model for a computer system using an application programming interface in accordance with the embodiment.

A computer system is illustrated in FIG. 15 where it is illustrated that the applications (e.g. user programmes) 1704 access the Operating System 1702 and Hardware 1701 functionality via the API 1703. In this way the applications 1704 can carry out process control, file management, device management, communications and other system functions necessary for their operation.

Therefore, a rogue computer program must also be configured to access the operating system 1702 and the hardware 1701 through the API 1703.

Figure 16:
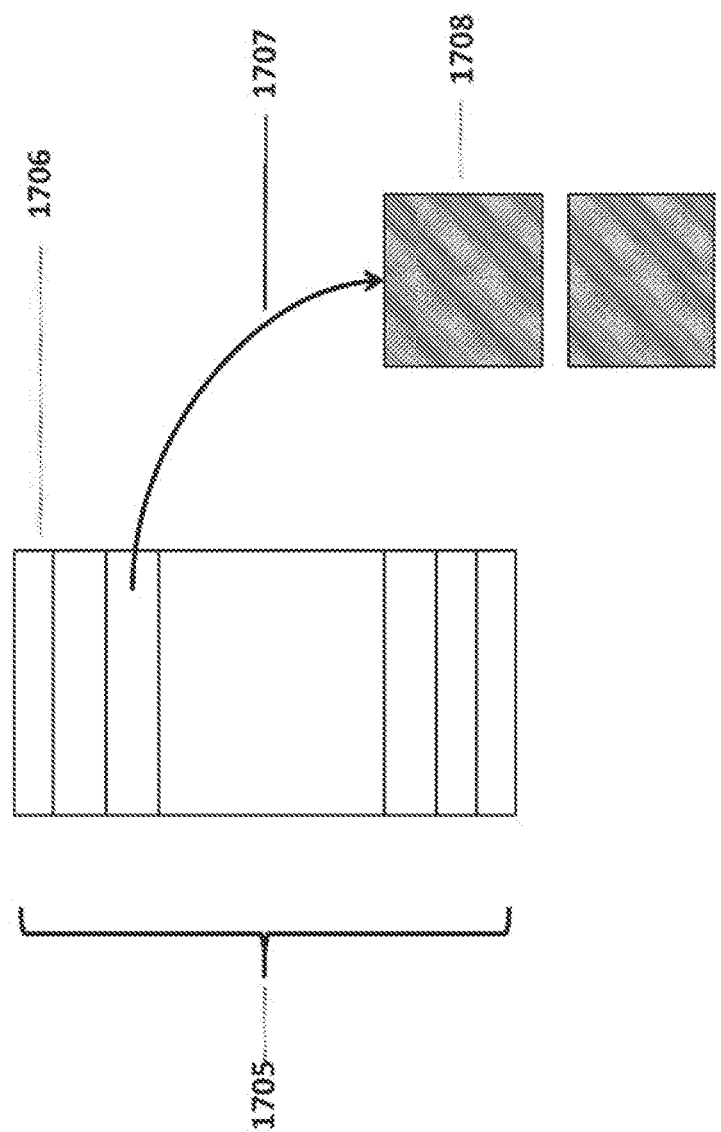
FIG. 16 illustrates how a table of addresses is accessed to manage the interaction between the computer program and the hardware in accordance with the embodiment.

FIG. 16 schematically illustrates the table 1706 of addresses of the routines that a computer program would need to use to access the functionality of hardware The table 1706 is indexed 1705 and the index is used to call a corresponding routine 1708. If the ordering of the addresses in table 1706 is only known to an authorised person, persons, organisation or other authorised entity then only they will know the correct system calls that are necessary to call the required routines and be able to write applications to successfully run on this computer system. That is to say, only a person (or party) with knowledge of the reassignment of the index values using the function call variation key would be able to write applications which can run on a computer system comprising the API 1703.

Figure 17:
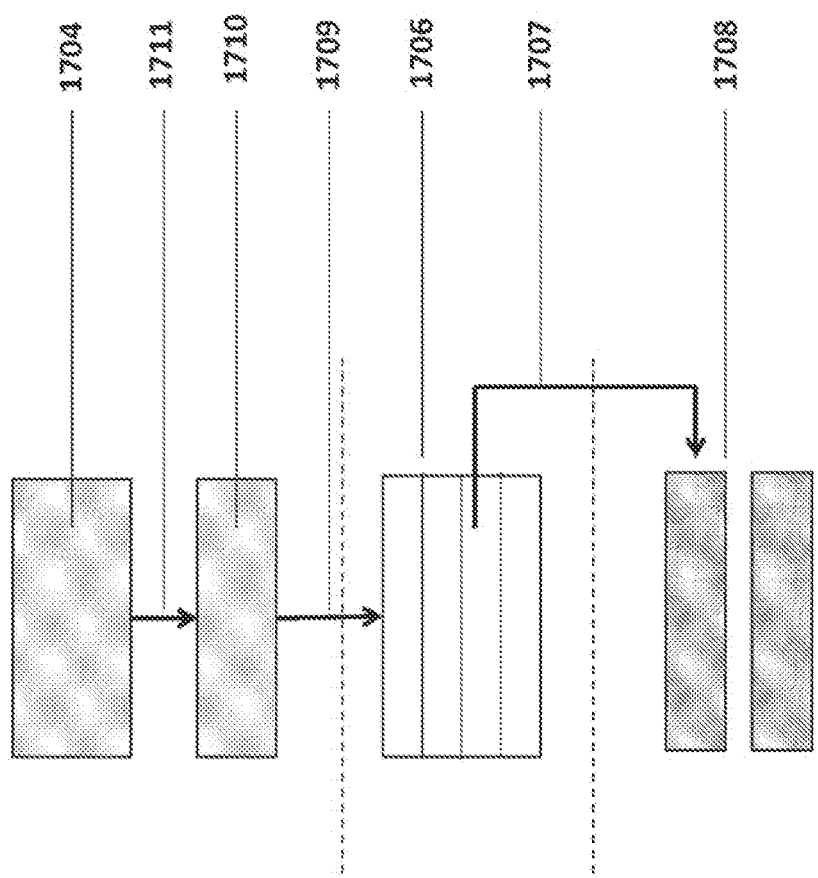
FIG. 17 illustrates a sequence by which an application accesses an operating system in accordance with the embodiment.

In FIG. 17 an application 1704 calls 1711 a library routine 1710. The library routine 1710 uses a system call 1709 which provides the index into the lookup table of addresses of routines 1706. The table of addresses of routines 1706 provide access to the operating system and hardware functionality 1708. The library 1710 and the table of addresses of routines 1706 together provide the API 1703 which provides the means by which applications 1704 can access the functionality of the operating system 1702 and hardware 1701.

The library 1710 and the table 1706 can be varied in much the same way as a CPU and software can be in accordance with steps S600 to S612 and S700 to S708.

That is to say, the table 1706 can be input into a transformation process which can apply a transformation operation (using the function call variation key as an operand) to the indices in the table to modify the indices so that a second table is formed. This is illustrated schematically in FIG. 17a. The transformation operation may comprise a series of operations using a series of function call variation keys. The function call variation key may be pseudo-randomly or randomly generated.

Figure 17A:
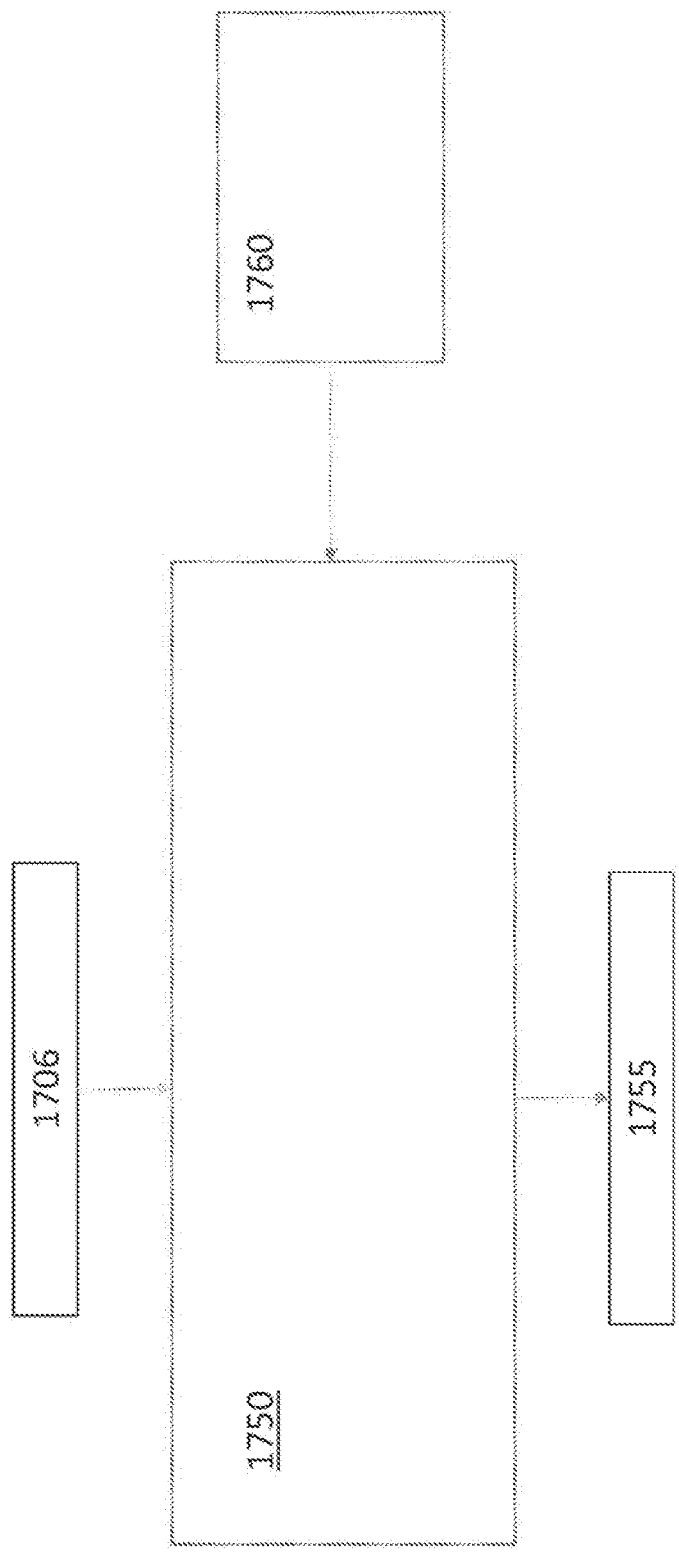
FIG. 17a illustrates a transformation process which could be applied to a table of routines in accordance with the embodiment.

FIG. 17a illustrates that a lookup table 1706 can be input as a data file (or any other suitable data structure) into a transformation module 1750. The transformation module 1750 applies a reassignment routine 1760 to the table 1706 based on the function call variation key 1760 which forms the basis for a transformation of the indices in the table (in combination with a suitable arithmetic or logical operation).

The function call variation key 1760 is used as an operand in an operation which is applied to each index in the table 1706 to generate a modified table 1755. If the modified table 1755 is used in place of the table 1706 then only parties who know the variation which has been applied to the table 1755 can write computer programs which can correctly use the API 1703 to access the hardware and the functionality of the operating system. Therefore, the variation introduced will prevent the use of computer programs on the host computer which are not compiled using the modified table 1755.

By generating a unique library 1710 and the modified table of addresses of routines 1755 that is only known to an authorised person, persons, organisation or other authorised entity the computer system can be protected against rogue computer programs.

Figure 18:
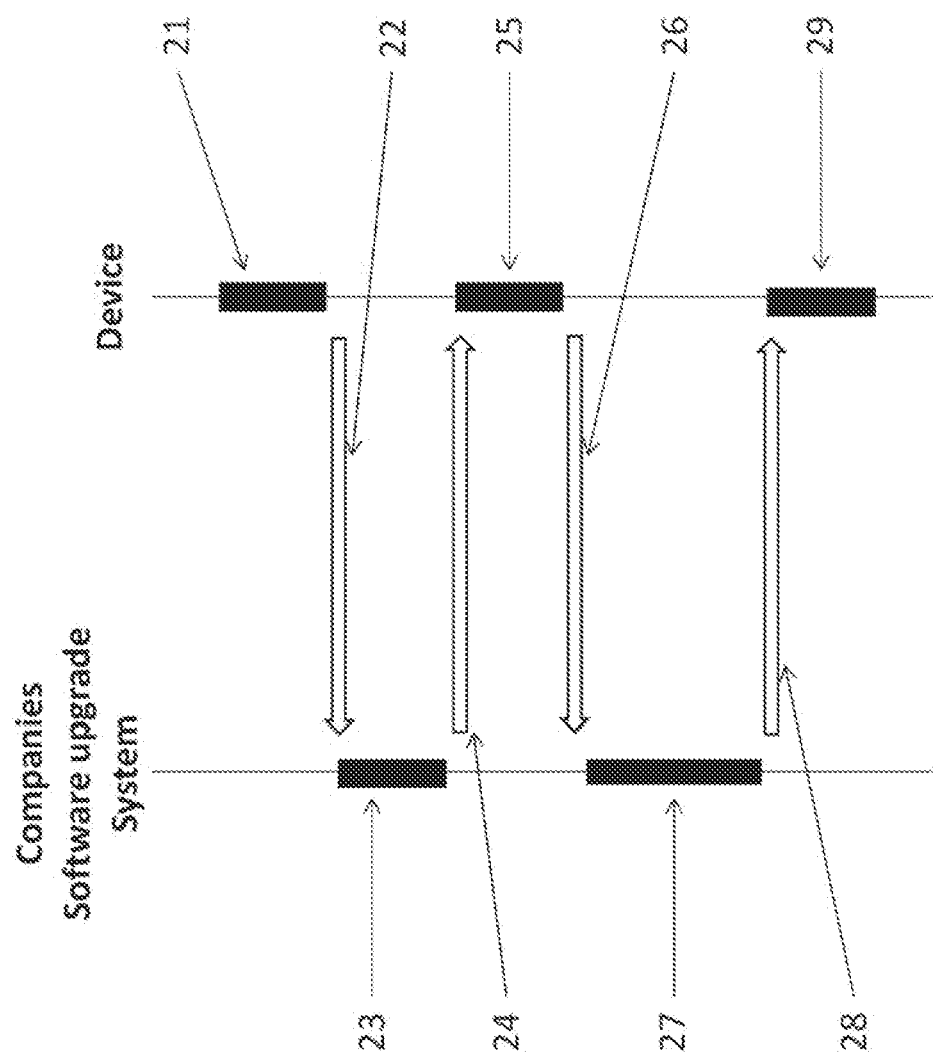
FIG. 18 illustrates a flow diagram showing the steps involved in a device requesting an upgrade to a computer program in accordance with the embodiment.

FIG. 18 shows the scenario where a computer system which has been developed using the techniques described in reference to FIGS. 15 to 17 requests an upgrade to a computer program it is running. It may do this as part of its routine maintenance 1721 or the developer of the computer program may initialize the upgrade process as part of its own program of maintenance. The producers of computer programs may keep a table where each function call variation key 1760 is indexed with a serial number. The serial number may be distributed with the computer program executable corresponding to the computer program and saved on the device.

The device sends a request to the companies' software upgrade system 1722 to initiate the upgrade process 1723. The companies software upgrade systems requests the serial number from the device 1724 to determine the function call variation key 1760 used to introduce the variation leading to the generation of the modified table of routines 1755. Other forms of identification may be used to identify the device 1724.

The device retrieves the serial number (or other identification) 1725 and sends it to the companies software upgrade system 1726. The companies' software upgrade system uses the serial number (or other identification) to retrieve the function call variation key for that device and it rebuilds the requested software for that device 1727. Providing that the company is the only entity that knows the mapping between the serial number (or other identification) and the corresponding function call variation key 1760 then only the company can build a piece of software that will run on that device as only that company can determine the modifications that have been made to the table of routines which are necessary to correctly utilise the API 1703.

The companies' software upgrade system sends the requested software to the device 1728. The device receives the requested software upgrade, installs it and runs it. Providing that this software has been produced using the correct variation key it will run correctly as it will use the API 1703 correctly to access the hardware. If however the software has not been produced using the correct variation key then it will run incorrectly and the devices error detection features should detect this and stop running the newly installed software.

This means that computer programs that have been downloaded illegally will not be able to correctly use the API 1703 as they will not be able to make the correct API calls necessary to correct utilise the routines in the modified table 1755. The operating system will generate a system call which terminates the program when a determination of an invalid function call is made to the API 1703.

The result of using a modified table 1755, i.e. a table of API calls which designates some calls as being indicative of rogue software, is that the loader 31 may determine the presence of such illegal API calls at the loading stage. The loader may then just halt the loading process and prevent the rogue software from running Additionally, the modified table 1755 can be used to map specific illegal system calls to an alert to the computer system which stops the program from running. Indeed, the computer system may be configured to scan for illegal system calls inside an executable.

The computer system may utilise a disassembler to retrieve computer program executables when they have been stored in the computer system and disassemble the computer program executable to extract each of the instructions which is to be carried out by the CPU 2. This will list all of the instructions, including system calls. Each system call corresponding to an API call will contain an index into the table of API calls in order to designate the function that is requested. The computer system may then scan the list of instructions to retrieve all of the system calls and, upon detection of an API call which uses an index which corresponds to an illegal instruction, the computer system may then mark the executable as corrupt which will stop the executable from running.

That is to say, the compiler which generates the executable must compile the executable in a way which is compatible with the varied table 1755. That is to say, where the code generation aspect of the compiler translates an API call receiving an index as a call into machine code, it must apply a transformation which transforms the index appropriately so that it is consistent with varied table 1755.

Designating illegal API calls in this way also means that illegal API calls can be detected at load time and at run time using principles similar to those described in FIGS. 14 and 14a.

The CPU may determine a lack of compatibility by determining that the executable contains illegal API calls at load time or at run time.

The CPU can also be transformed to be consistent with the varied table 1755 by applying a compatible transformation to all of the opcodes that utilise an API call.

Similar principles to those described in relation to FIGS. 15 to 18 can also be used where a virtual machine 15 utilises a virtual API.

The principles described up to now can also assist in the recovery of functionality in a computer system which has been configured using the modified CPU and/or API described above.

In conventional computer systems, updates to previous software are assigned a trusted status by the CPU 2 and the operating system. They are loaded into computer memory by the loader 31 and executed by the CPU 2 in accordance with the scheduling function provided by the operating system.

Conceptually, a trusted program is given one of three statuses by the operating system. They are runnable, running and blocked. Runnable is when the program is loaded into memory and can be run. Upon execution by the CPU 2 the program is tagged is "running" and when it is waiting for resources from the operating system it is described as blocked. The problem is that updates to software are given a trusted status, and therefore a route into the computer system, without proving any trustworthiness credentials.

We propose a computer system by which computer programs and there updates are managed in order to mitigate against lost functionality due to a rogue computer program. We describe this system with reference to FIG. 19 and FIG. 20.

Figure 19:
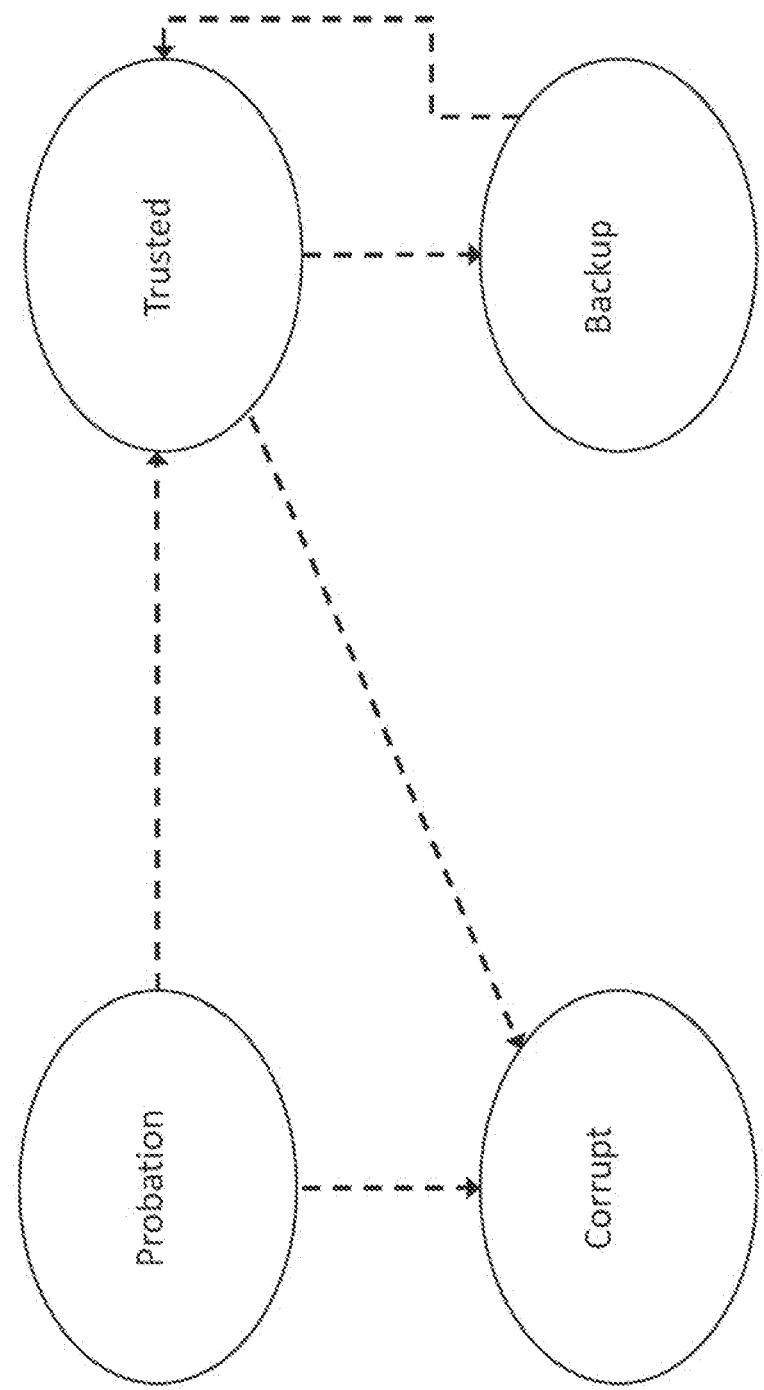
FIG. 19 illustrates a computer system which assigns states to a software upgrade in accordance with the embodiment.

FIG. 19 describes the states given to a software update in accordance with the system. A software upgrade may be downloaded in accordance with steps S1200 to S1208 described above in respect of FIG. 12.

This software upgrade, and its corresponding executable, are given a probationary status and tagged as trusted only when a probationary period is passed and a trustworthiness criteria has been satisfied. The trustworthiness criteria may set out a number of successful runs, a number of successful API calls to modified table 1755 and an absence of illegal instructions and/or API calls.

If the software upgrade passes the probationary period and satisfies the trustworthiness criteria it is marked as trusted and its status is transferred to trusted by the CPU 2 and the operating system.

If a computer program executable corresponding to the upgrade which has trusted status is detected by the loader 31, the operating system or the CPU 2 as having any illegal instructions or illegal API calls then it is marked as corrupt as this will indicate that it the executable was not compiled using a compatible compiler and is likely to be rogue software. An executable can also be marked as corrupt if the operating system or the CPU 2 determines that it has committed any addressing violations during running.

If an upgrade to a computer program is assigned trusted status, i.e. it passes its probation, then the previous version is assigned "backup" status.

If a computer program that is on probation or trusted and is marked as corrupt then it is replaced by a previous version which was given "backup" status.

Only programs which are on probation or trusted can be executed by the CPU 2.

Figure 20:
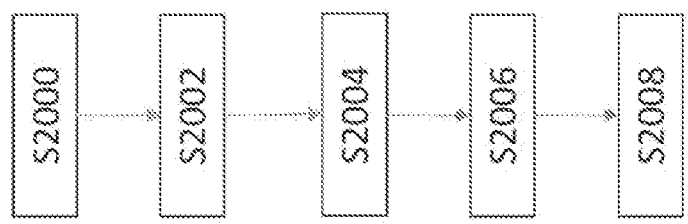
FIG. 20 illustrates a flow diagram which shows the steps in recovering functionality in a computer system.

We describe using FIG. 20 how this computer system can be used to recover functionality which has been compromised by a rogue software update.

If a rogue software upgrade (on probation or assigned trusted status) has been detected by the CPU 2 or the operating system 1702 or the computer system itself as containing illegal instructions or API calls in a step S2000 (in accordance with the principles described in respect of FIGS. 12 to 18) then it will be marked as corrupt and prevented from running on the computer system in a step S2002.

This will mean that the computer system is deprived of the functionality provided by the corresponding computer program.

The computer system will then retrieve the previous version of the software from the "backup" store in a step S2004.

The previous version is then transitioned from "backup" to "trusted" in a step S2006 and so it can be used by the system to replace the functionality lost due to the removal of the upgrade due to its corrupt status. The system then runs the backup version in a step S2008 and recovers the lost functionality.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:

1. A computer-implemented method of configuring a computer system configured to run an operating system, to enable the computer system to resist the execution of unauthorized software, the method comprising:

instantiating an application programming interface to enable an application running on the computer system to access functionality of the operating system; and applying a transform to the application programming interface to modify the application programming interface, wherein applying a transform to the application programming interface comprises applying a first transformation process to an indexed table of function calls to form a modified table of function calls, wherein the indexed table lists a plurality of function calls each corresponding to an index and the first transformation process re-assigns each index to a different function call, wherein at least one index is assigned by the first transformation process to an illegal instruction trap, wherein, responsive to a computer program issuing a call for a function corresponding to the illegal instruction trap, the execution of the application is halted.

2. The computer-implemented method according to claim 1, wherein the first transformation process comprises the application of at least one operation based on a function call variation key.

3. The computer-implemented method according to claim 2, wherein the application of at least one operation comprises the application of a plurality of operations each based on a respective function call variation key.

4. The computer-implemented method according to claim 2, wherein the at least one operation is an arithmetic operation.

5. The computer-implemented method according to claim 2, wherein the function call variation key is pseudo-randomly or randomly generated.

6. The computer-implemented method according to claim 1, wherein the transform is assigned to a serial number in a table.

7. The computer-implemented method according to claim 1, wherein the at least one index is selected based on proximity to a vulnerable instruction.

8. The computer-implemented method according to claim 1, wherein the application programming interface is instantiated on a virtual machine to be executed on the computer.

9. The computer-implemented method according to claim 1, wherein the transform is applied to parameters received by a function call.

10. The computer-implemented method according to claim 9, wherein the transform switches the parameters around to modify the order in which parameters are received by the respective function.

11. The computer-implemented method according to claim 1, wherein the transform changes the method by which parameters are passed to a function from the application.

12. The computer-implemented method according to claim 11, wherein the transform changes the method by which data is passed by the function to the application.

13. The computer-implemented method of claim 1, further comprising:
preventing the execution of an application on the computer system by:
determining the presence of incompatibility between the application and the application programming interface; and
halting the execution of the application.

14. The computer-implemented method according to claim 13 wherein determining the presence of incompatibility between the application and the application programming interface comprises determining the presence of an illegal instruction in the executable corresponding to the application.

15. The computer-implemented method according to claim 14 wherein the determining of the presence of an illegal instruction is performed at run time.

16. The computer-implemented method according to claim 14 wherein the determining of the presence of an illegal instruction is performed by a loader.

* * * * *